United States Patent [19]

Farrow et al.

[11] Patent Number: 5,150,847
[45] Date of Patent: Sep. 29, 1992

[54] CASSETTE LOADER WITH LEADER TAPE EXTRACTION AND TRANSFER, AND METHOD

[75] Inventors: Robert I. Farrow; Drey Johnson, both of Burlington, N.C.

[73] Assignee: Concept Design, Graham, N.C.

[21] Appl. No.: 609,589

[22] Filed: Nov. 6, 1990

[51] Int. Cl.⁵ .......................................... B65H 23/04
[52] U.S. Cl. ................................ 242/56 R; 242/58.4
[58] Field of Search ............... 242/56 R, 58.1, 58.4, 242/58.5; 156/502, 506

[56] References Cited

U.S. PATENT DOCUMENTS

| | | | |
|---|---|---|---|
| 3,814,343 | 6/1974 | Bennett et al. | 242/56 R |
| 3,997,123 | 12/1976 | King | 242/56 R |
| 4,061,286 | 12/1977 | King, Sr. et al. | 242/56 R |
| 4,216,052 | 8/1980 | Zielke | 242/56 R |
| 4,332,355 | 6/1982 | Zopfy et al. | 242/56 R |
| 4,911,774 | 3/1990 | Gardner | 156/506 |

OTHER PUBLICATIONS

"Offer of Sale of Otari Cassette Loader".

Primary Examiner—Daniel P. Stodola
Assistant Examiner—John Q. Nguyen
Attorney, Agent, or Firm—W. Thad Adams, III

[57] ABSTRACT

A cassette loader for loading a length of magnetic tape into a cassette having a relatively short length of leader tape preloaded into the cassette and attached by opposite ends to respective first and second cassette hubs, the cassette loader including a transfer arm for transferring a length of leader tape extracted from the cassette at a leader tape extracting position to a splicing block for splicing to a length of magnetic tape. The transfer arm is mounted for movement on the cassette loader. A leader tape extractor is carried by the transfer arm for holding the leader tape. The transfer arm moves in an arc between the leader tape extracting position and a point past a side of the splicing block remote from the leader tape extracting position to a leader tape delivery position to deliver the leader tape to the splicing block for splicing. The transfer arm then returns to the leader tape extracting position.

11 Claims, 25 Drawing Sheets

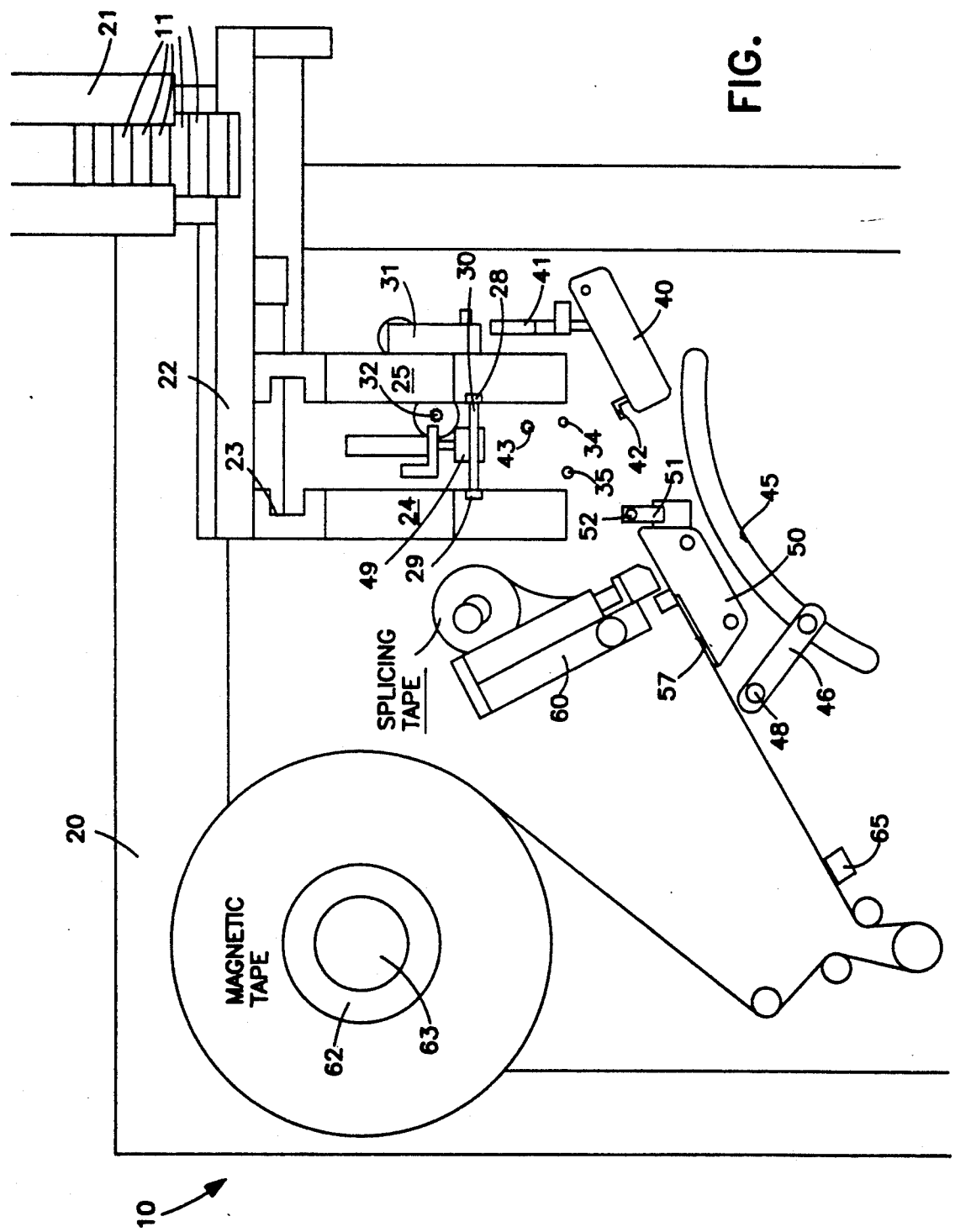

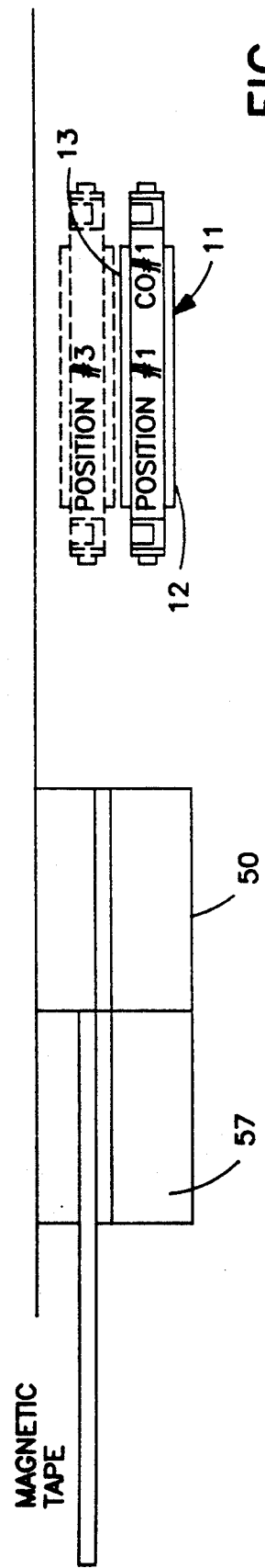
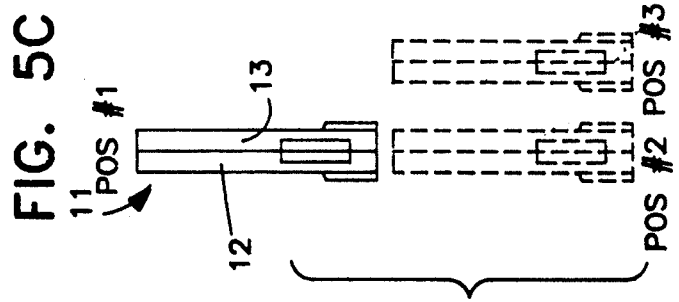
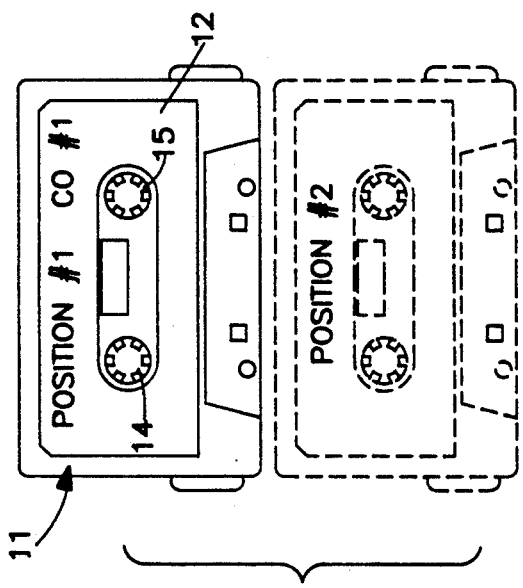
FIG. 5A
FIG. 5B
FIG. 5C

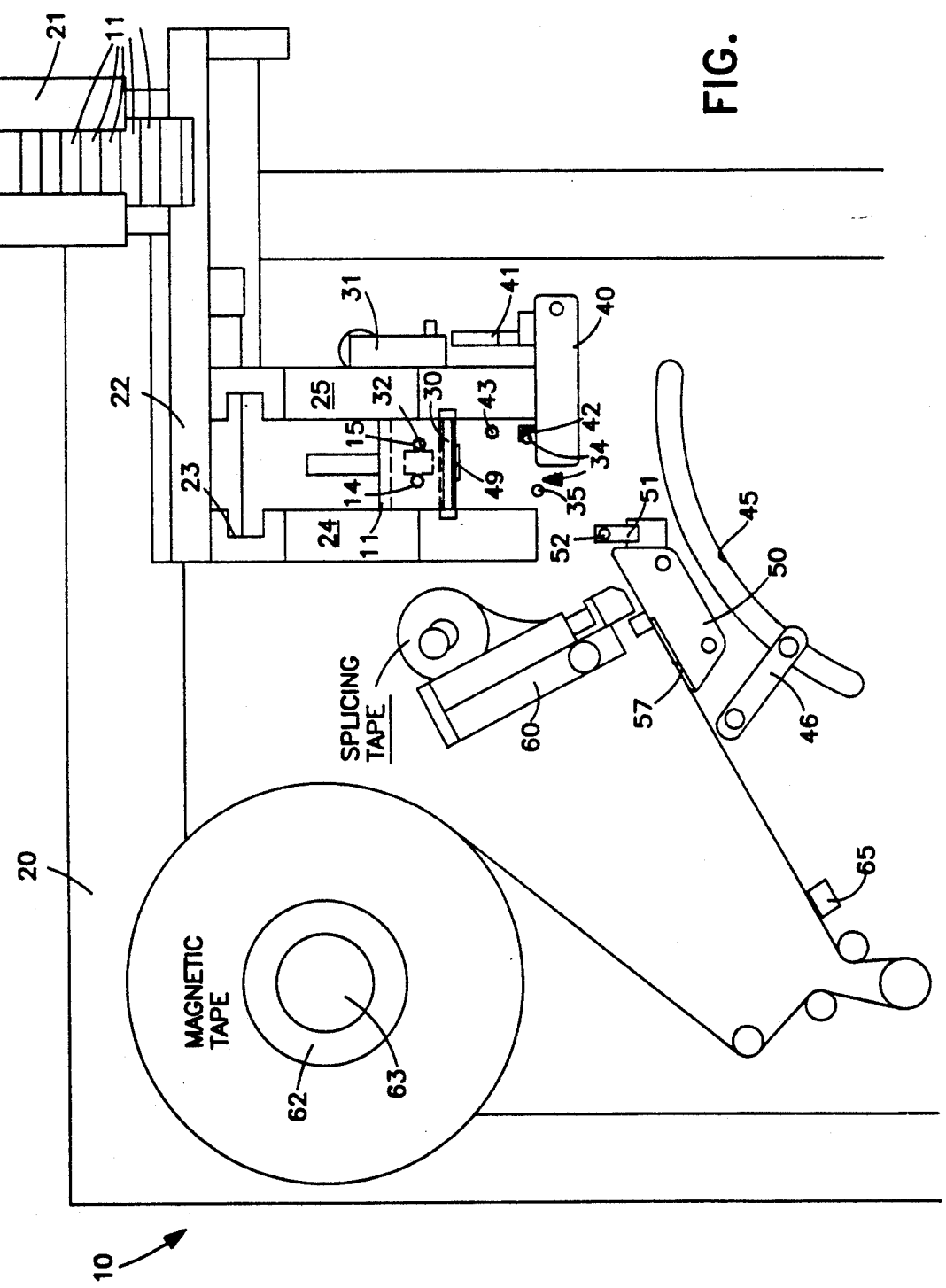

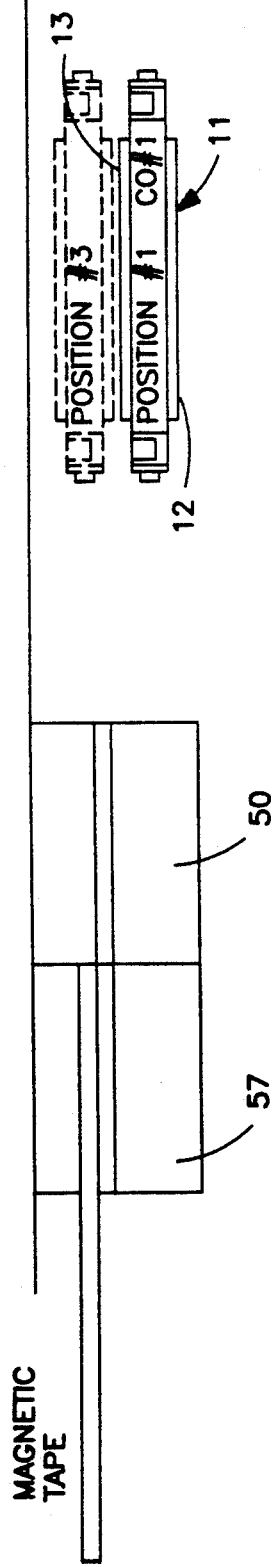
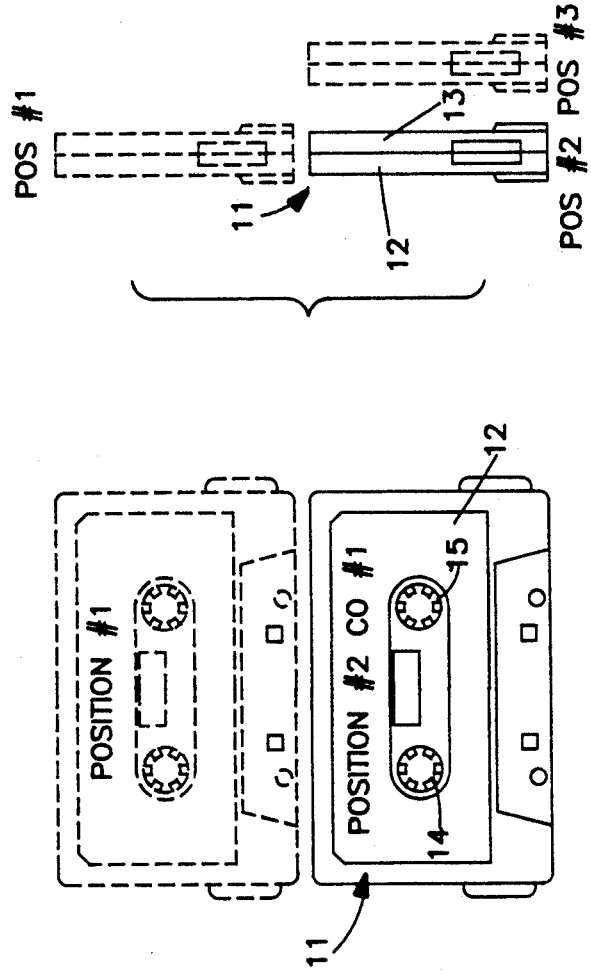
FIG. 8A
FIG. 8B
FIG. 8C

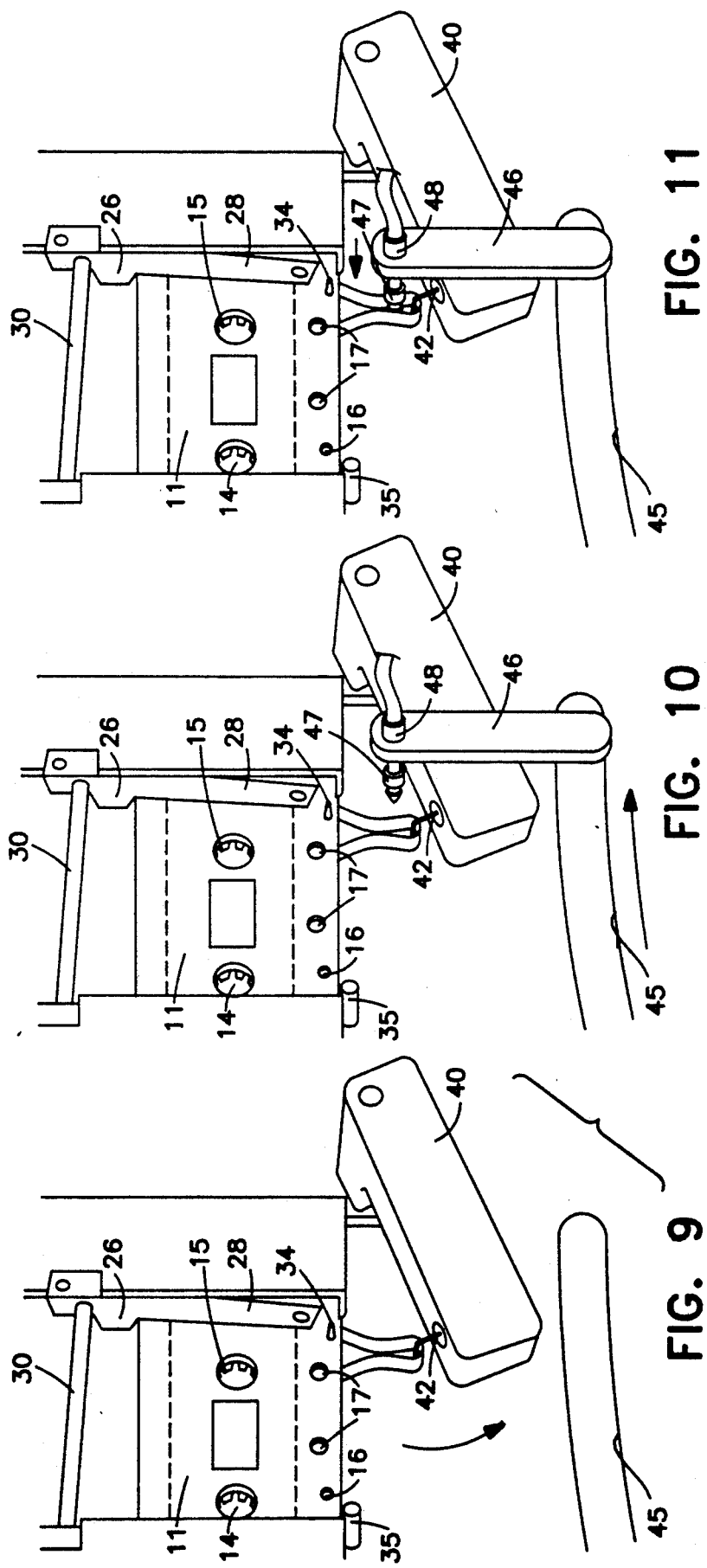

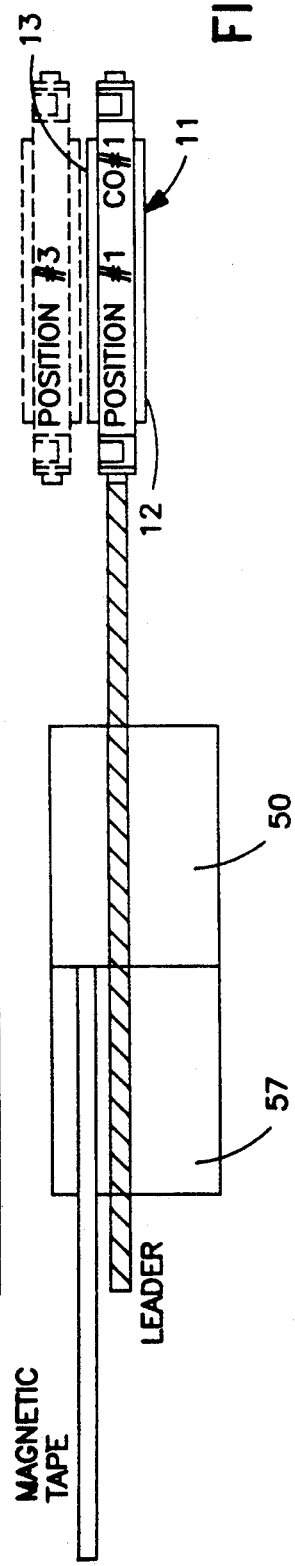
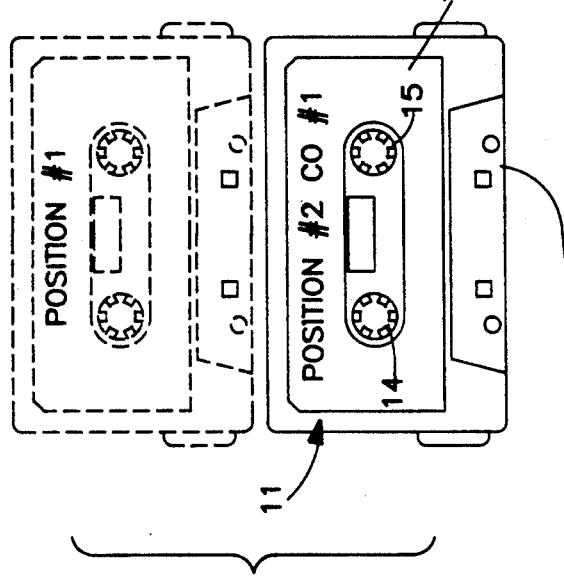
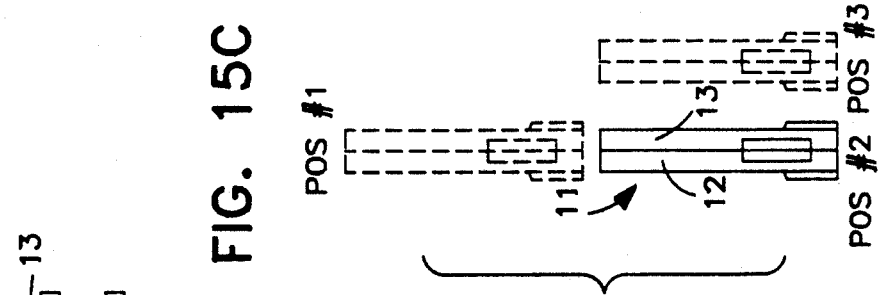
FIG. 15A
FIG. 15B
FIG. 15C

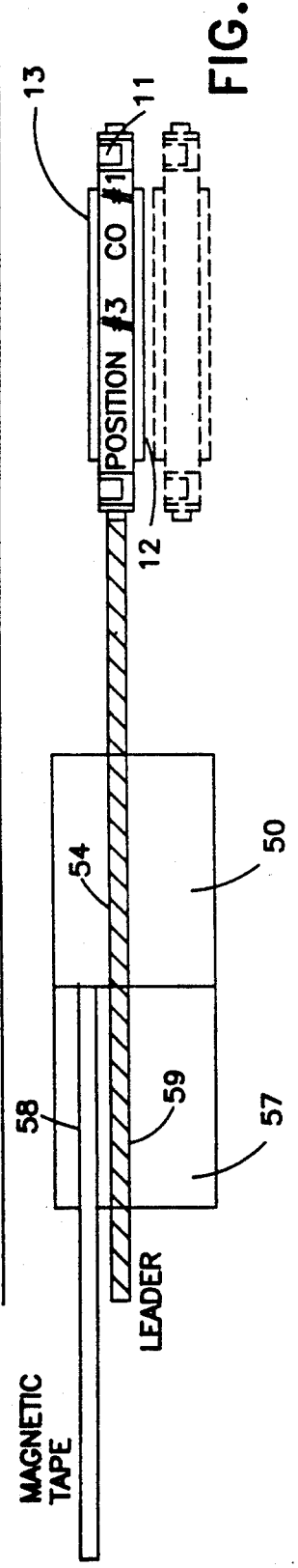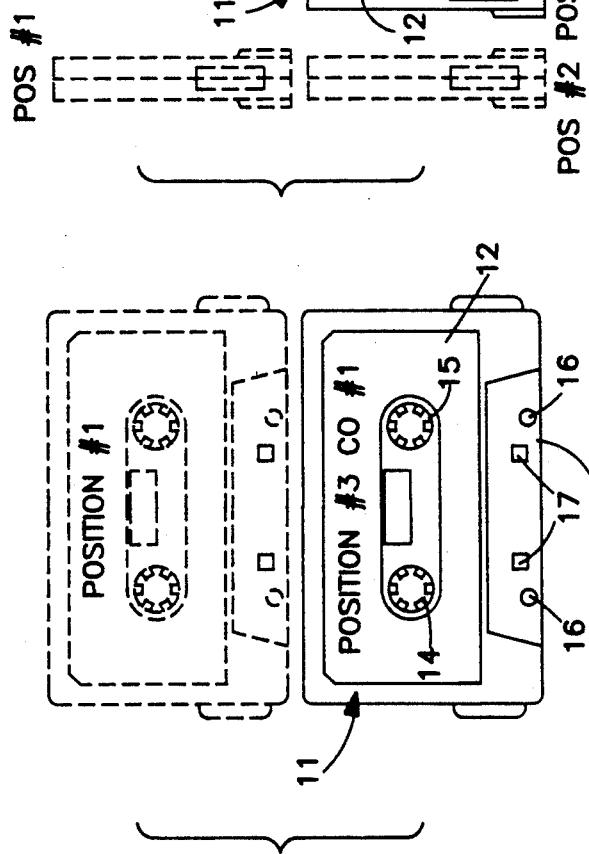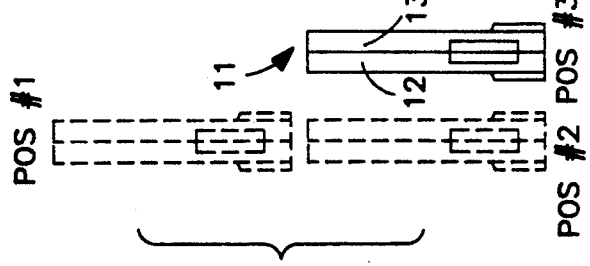

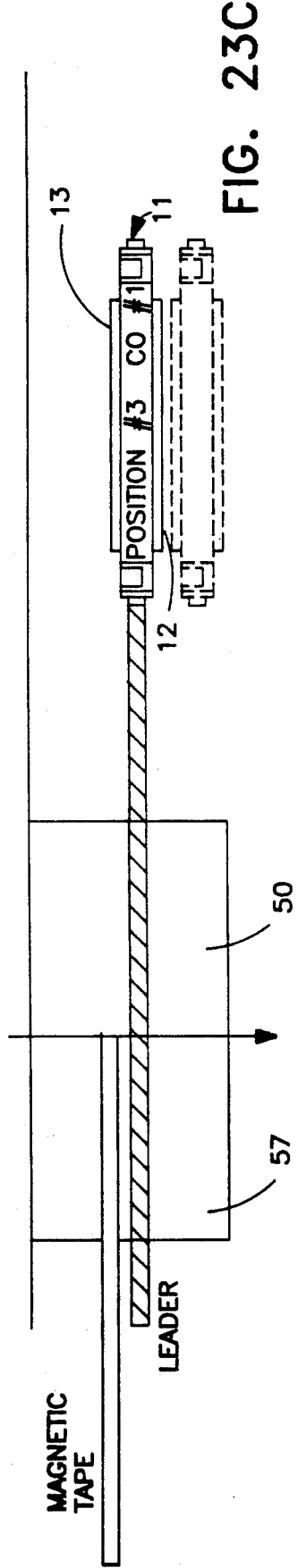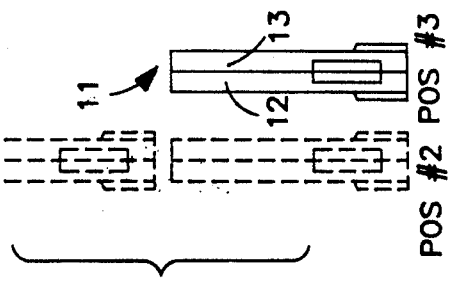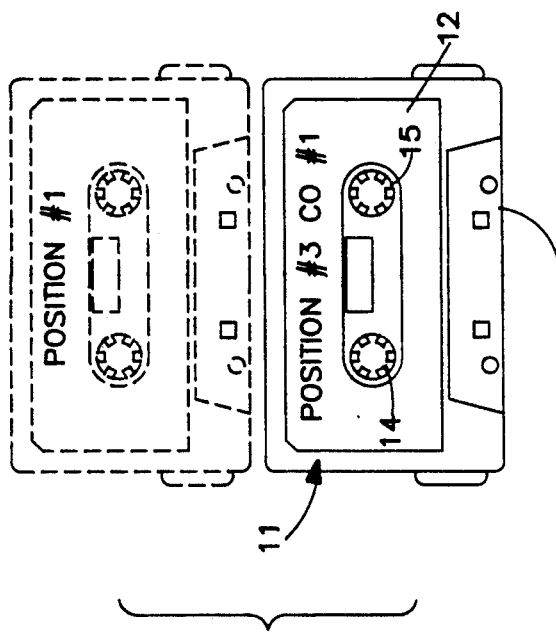
FIG. 23A
FIG. 23B
FIG. 23C

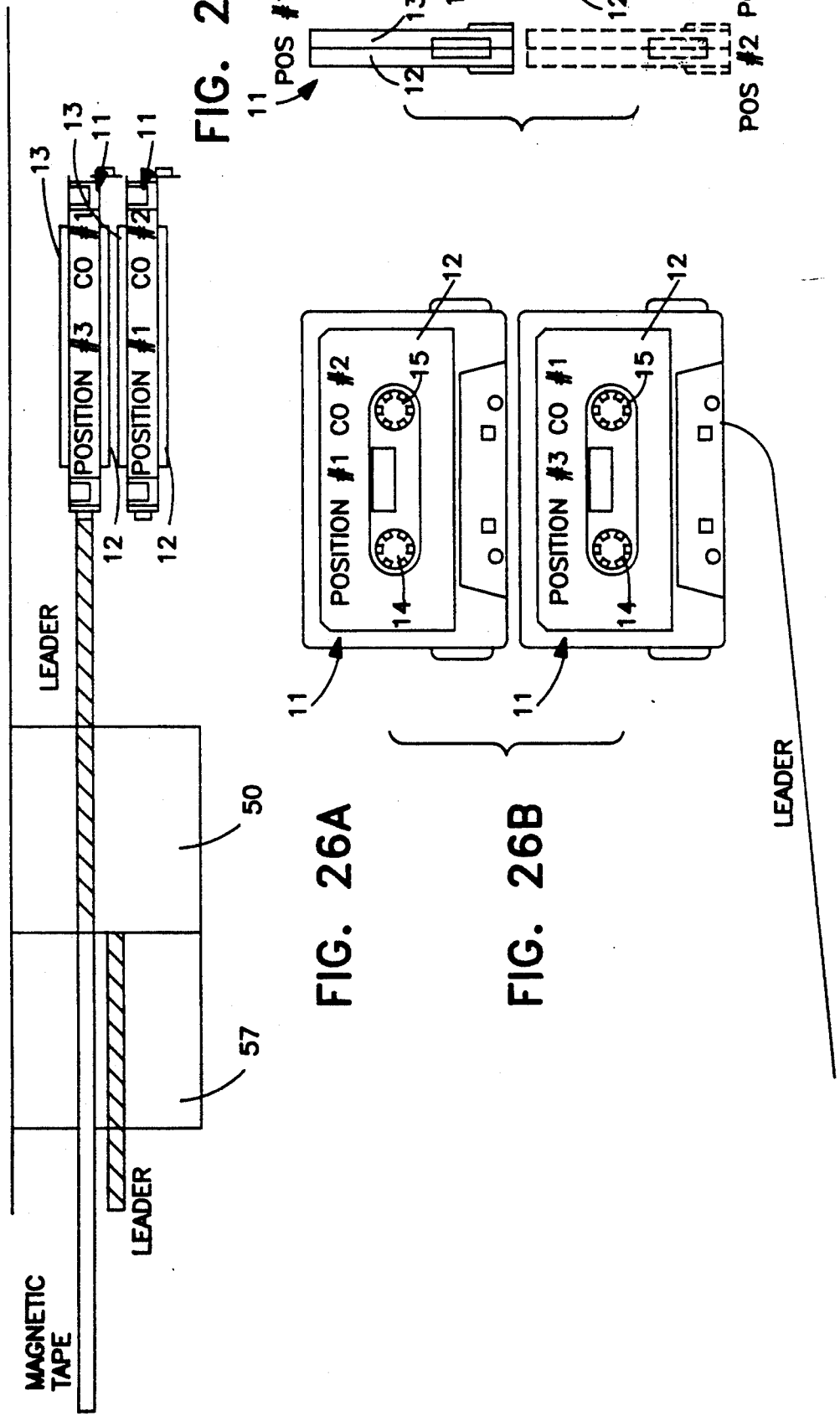

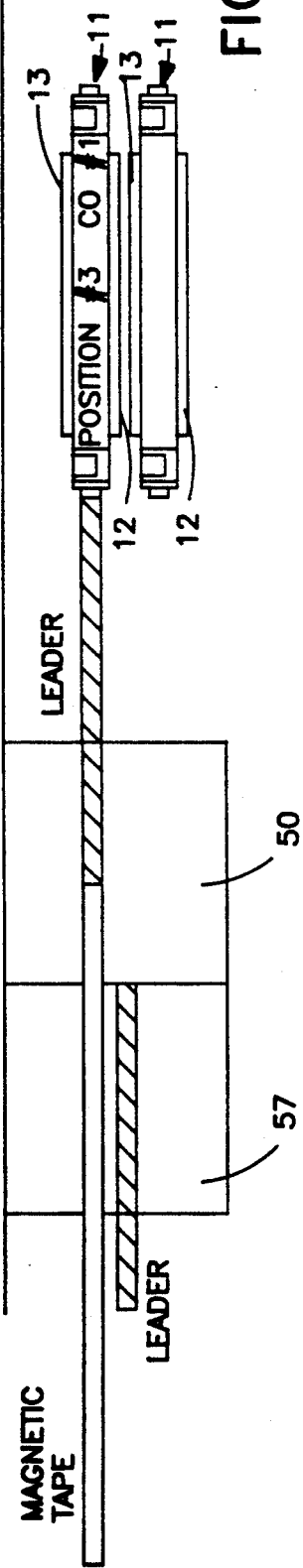
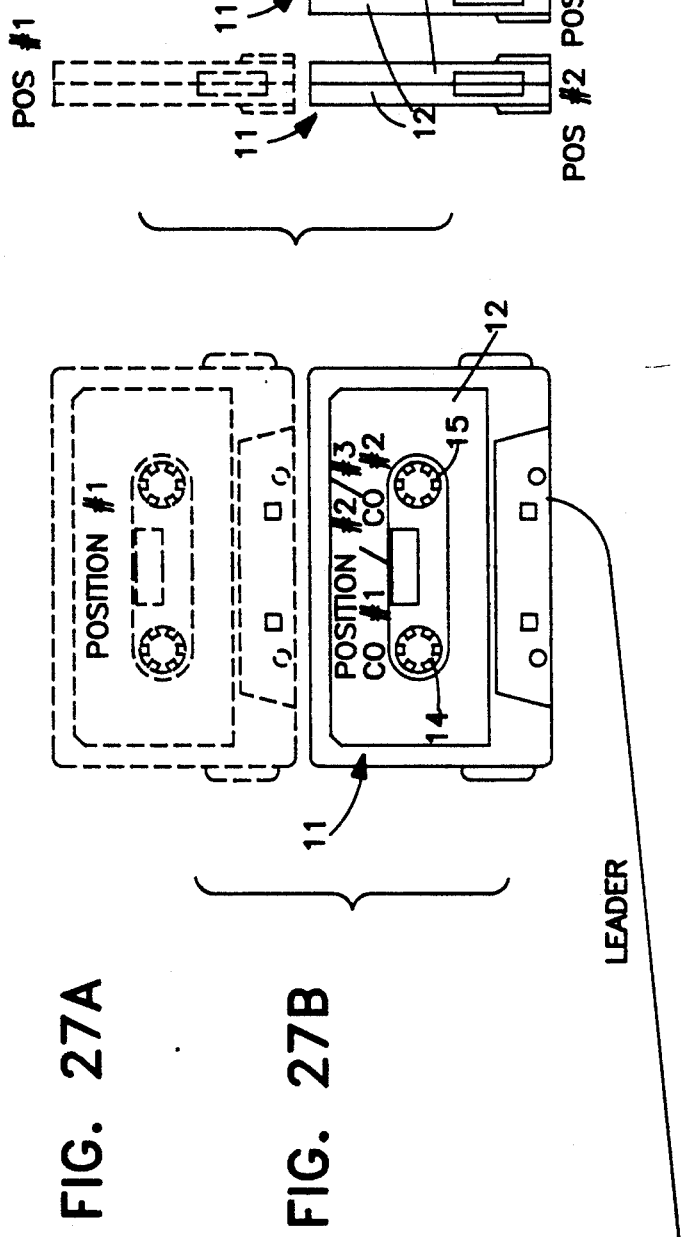
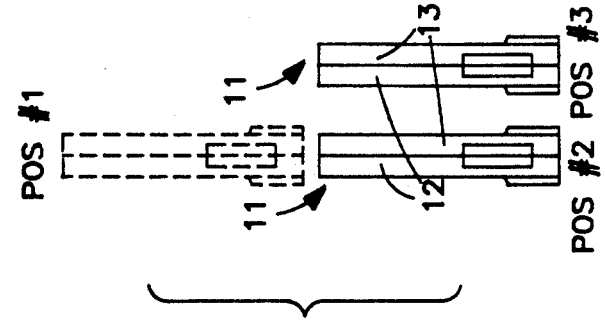
FIG. 27A
FIG. 27B
FIG. 27C

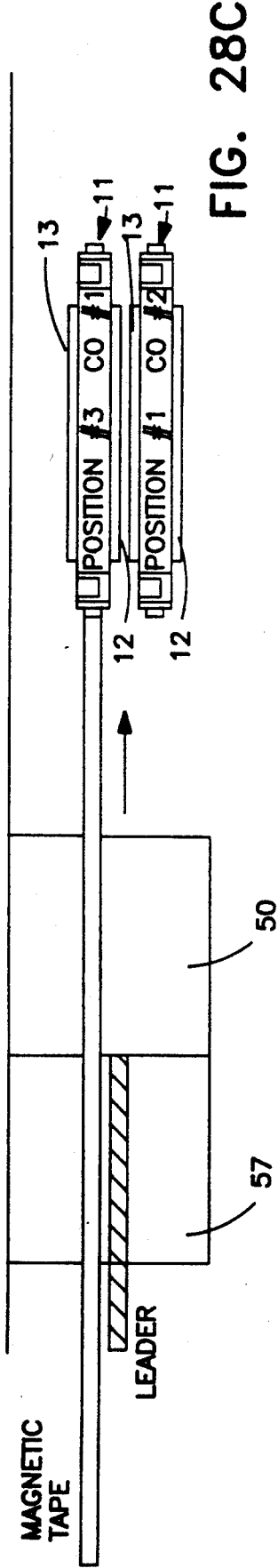
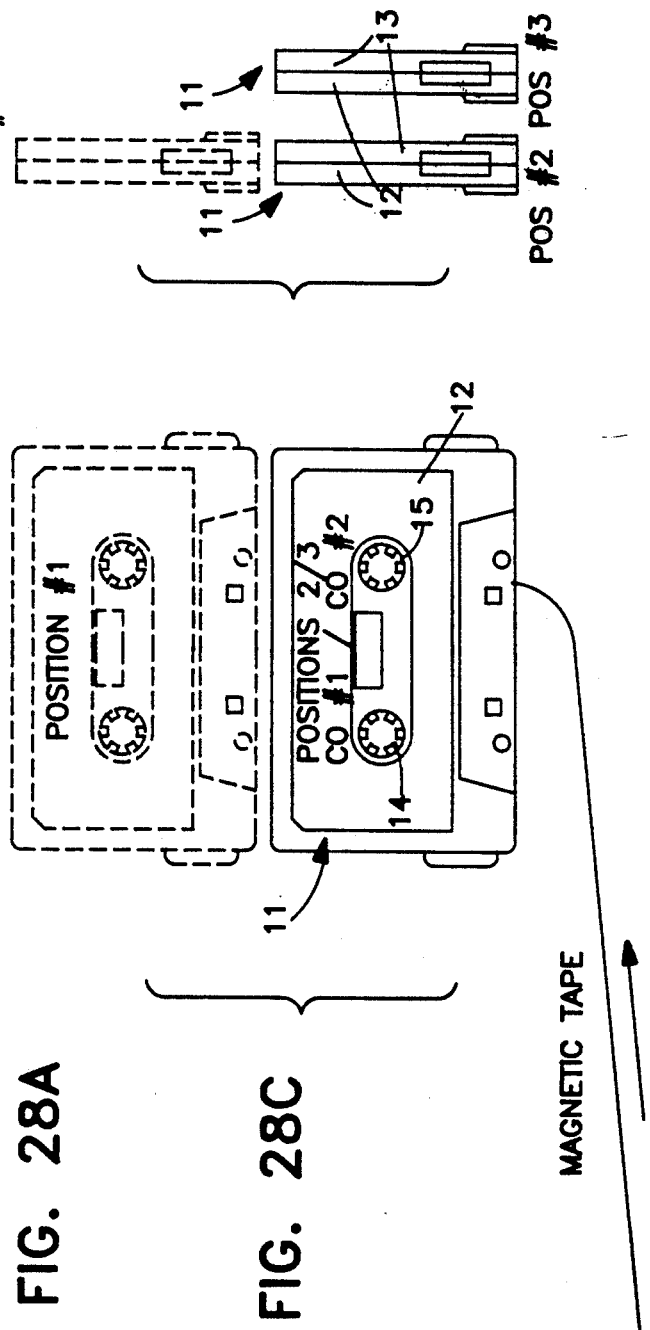
FIG. 28C
FIG. 28A
FIG. 28C

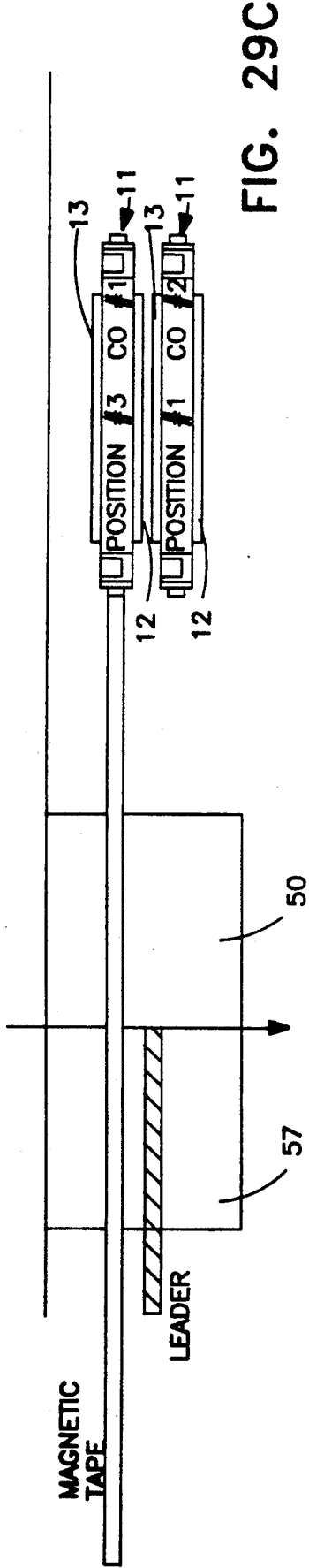
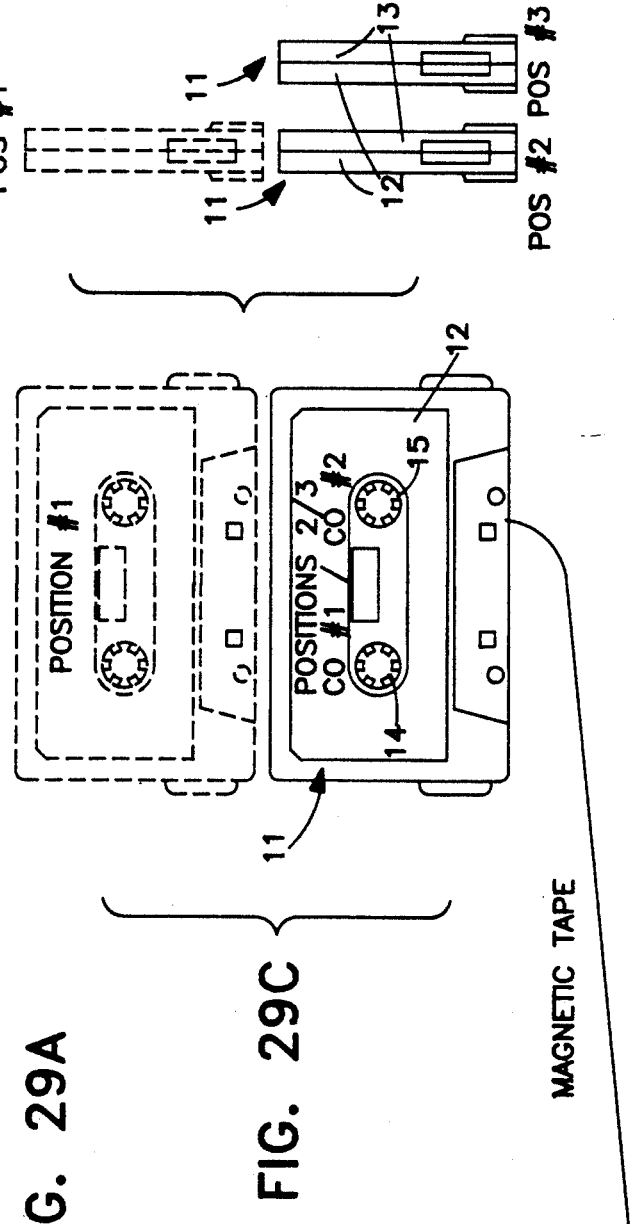
FIG. 29A
FIG. 29C

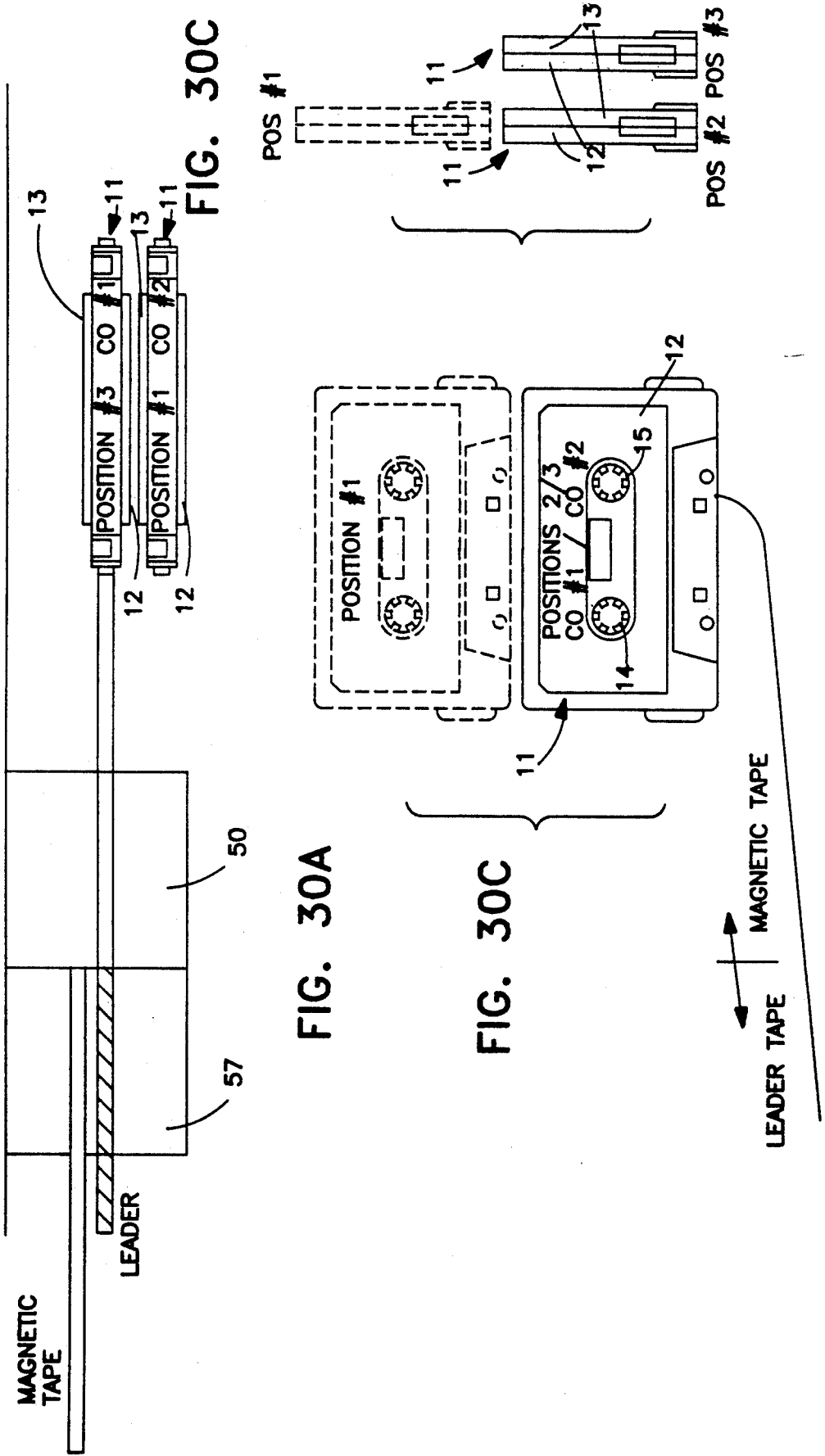

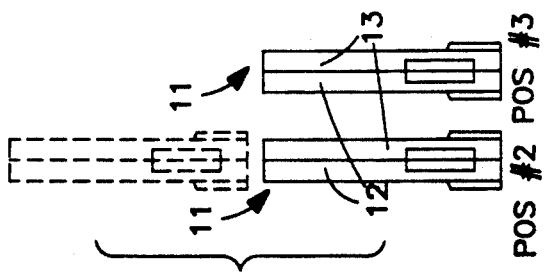
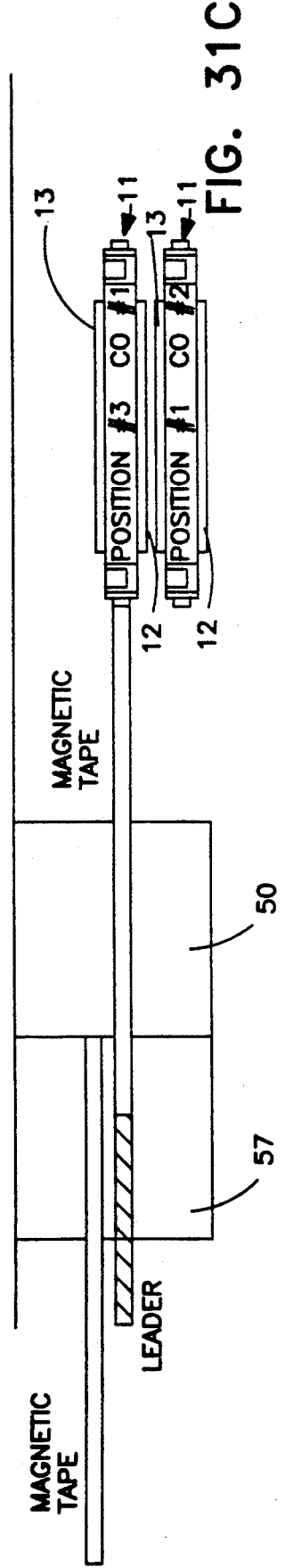
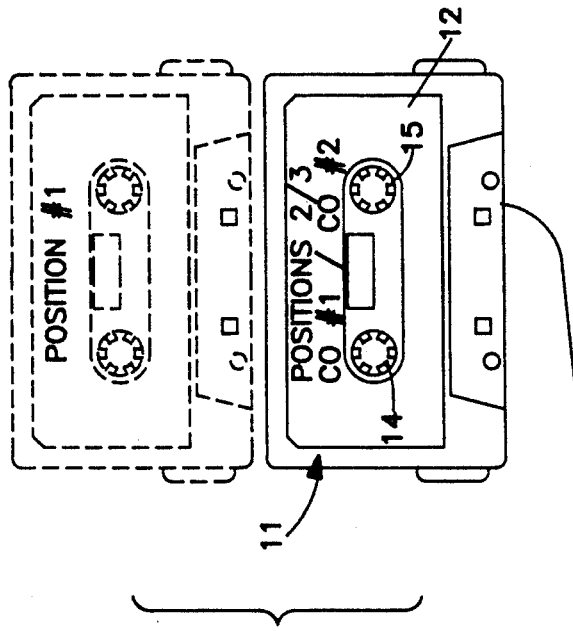
FIG. 31C
FIG. 31A
FIG. 31B

CASSETTE LOADER WITH LEADER TAPE EXTRACTION AND TRANSFER, AND METHOD

TECHNICAL FIELD AND BACKGROUND OF THE INVENTION

This invention relates to a cassette loader which achieves increased tape loading efficiency by performing certain steps to different cassettes simultaneously. High speed automatic cassette loaders are known. Representative Patents disclosing such loaders are U.S. Pat. Nos. 4,061,286 (King, Sr. et al), 3,997,123 (King), 3,814,343 (Bennett) and 4,332,355 (Zophy). As used in this application the term "cassette" refers to an industry standard audio cassette such as are shown in the drawings. See, e.g., FIGS. 5B and 5C. Such cassettes are formed of a pair of shell halves which are secured together by glue, screws, sonic welding or other means to form the body of the cassette. A pair of hubs are positioned within the shell halves 12, 13 and are designed to freely rotate. A length of leader tape, about 70 cm, is attached by its opposite ends to the hubs. Thus, as used in the cassette loader the cassette is already loaded with the leader tape. Cassette has a pair of capstan holes and a pair of reference holes on both sides, i.e., in both shell halves. The bottom of the cassette is open to permit access by record and playback heads, drive capstans, etc.

In the audio industry these cassettes are referred to as "C-0" cassettes since in this form the cassette has "zero" minutes of recorded material. The purpose of the cassette loader is to load a predetermined length of magnetic tape into the cassette after the cassette shell has been assembled with the hubs and leader tape inside the cassette shell.

One important step involved in properly loading a cassette is to properly extract the already-loaded leader tape from the cassette so that the magnetic tape with the prerecorded material can be properly spiced onto the leader. Prior art devices do this with vacuum. Furthermore, prior art cassette loaders perform the leader tape extracting step sequentially with the other steps in the loading process. The invention of this application permits leader tape extraction at one position to a first cassette while loading of another cassette with magnetic tape is taking place. This achieves significant savings in time and efficiency.

SUMMARY OF THE INVENTION

Therefore, it is an object of the invention to provide a cassette loader which provides enhanced leader tape extraction in preparation for splicing and winding magnetic tape into a cassette.

It is another object of the invention to provide a cassette loader which provides positive mechanical control of the leader tape during extraction and splicing.

It is another object of the invention to provide a cassette loader which avoids the use of vacuum as a means for extracting the leader tape from the cassette shell.

It is another object of the invention to provide a cassette loader which permits more accurate and secure placement of the extracted leader tape onto the splice block.

These and other objects of the present invention are achieved in the preferred embodiments disclosed below by providing a cassette loader for loading a length of magnetic tape into a cassette having a relatively short length of leader tape pre-loaded into the cassette and attached by opposite ends to respective first and second cassette hubs, the cassette loader including transfer means for transferring a length of leader tape extracted from the cassette at a leader tape extracting position to a splicing block for splicing to a length of magnetic tape. The transfer means comprise a transfer arm mounted for movement on the cassette loader, leader tape extractor means carried by the transfer arm for holding the leader tape, and movement means for moving the transfer arm in an arc between the leader tape extracting position and a point past a side of the splicing block remote from the leader tape extracting position to a leader tape delivery position to deliver the leader tape to the splicing block for splicing, and then to return the transfer arm to the leader tape extracting position.

According to one preferred embodiment of the invention, the transfer arm is mounted for arcuate movement in an arcuate guide slot formed in the cassette loader.

According to another preferred embodiment of the invention, the splicing block includes a planar splicing surface for supporting the tape during splicing. The planar splicing surface defines a plane, an extension of which plane is above the leader tape extractor means at the leader tape extracting position and at the leader tape delivery position and below the leader tape extractor means when the leader tape extractor means is moving over the splicing block with the loop of leader tape to cause the loop of tape to be wrapped over the splicing block and thereby securely placed in intimate contact with the splicing surface along the length of the splicing block as the tape is carried from the leader tape extracting position to the leader tape delivery position.

Preferably, the transfer means includes leader tape loop separating means for keeping top and bottom lengths of the leader tape loop from touching and damaging or cutting each other during tape extraction and splicing.

According to another preferred embodiment of the invention, the leader tape loop separating means includes vacuum means for exerting a holding vacuum pressure on the leader tape loop.

According to yet another preferred embodiment of the invention, the leader tape extractor means comprises an extractor guide pin having at least one vacuum port therein.

According to yet another preferred embodiment of the invention, the tape loop separating means comprises a leader separator pin movable substantially at right angles to the direction of movement of the transfer arm and guide pin for moving the separator pin into and out of a loop tape plane formed by the leader tape and for moving an upper length of the loop of leader tape out of the plane of a lower length of the loop of leader tape to be placed in the slicing block for splicing by a splicer positioned above the splicing block.

Preferably, leader loop separator pin includes a reduced radius for receiving the loop of leader therein.

Preferably, leader loop separator pin is mounted on the cassette loader at a point between the leader tape extracting position and the splicer.

An embodiment of the method according to the invention comprises the steps of providing a transfer arm mounted for movement on the cassette loader, providing leader tape extractor means carried by the transfer arm for holding the leader tape. moving the transfer arm in an arc between the leader tape extracting position and a point past a side of the splicing block remote from the leader tape extracting position to a leader tape delivery position to deliver the leader tape to the splicing block for splicing and returning the transfer arm to the leader tape extracting position without the loop of leader tape.

Preferably, the method includes the step of moving the transfer arm in an arcuate movement in an arcuate guide slot formed in the cassette loader.

According to one preferred embodiment of the invention, the splicing block includes a planar splicing surface for supporting the tape during splicing, the planar splicing surface defines an extended plane, and method includes the step of moving the transfer arm includes the steps of moving the transfer arm relative to the extended plane of the splicing surface above the leader tape extractor means at the leader tape extracting position and at the leader tape delivery position, and below the leader tape extractor means when the leader tape extractor means is moving over the splicing block with the loop of leader tape. The loop of leader tape is wrapped over the splicing block thereby securely placing the loop of tape in intimate contact with the splicing surface along the length of the splicing head as the tape is carried from the leader tape extracting position and at the leader tape delivery position.

Preferably, the method includes the step of separating the loop of leader tape into top and bottom lengths of leader tape for keeping the two sides of the leader tape loop from touching and damaging or cutting each other during tape extraction and splicing.

Preferably, the step of separating the loop of leader tape includes the step of exerting a holding vacuum pressure on the leader tape loop.

According to one preferred embodiment of the method of the invention, the step of transferring the loop of leader tape includes the steps of moving an extractor guide pin carried on the transfer arm at substantially right angles to the direction of movement of the transfer arm, and moving the extractor guide pin into and out of a plane defined by the leader tape.

BRIEF DESCRIPTION OF THE DRAWINGS

Some of the objects of the invention have been set forth above. Other objects and advantages of the invention will appear as the invention proceeds when taken in conjunction with the following drawings, in which:

FIG. 1 is a overall front elevation of the cassette loader according to an embodiment of the invention disclosed in this application;

FIGS. 5A, 5B and 5C are fragmentary top plan, front elevation and right side elevation views showing cassette movement and splice block position during leader tape equalization;

FIG. 6 is an enlarged front elevation view showing movement of the leader tape extractor assembly into extraction position;

FIGS. 8A, 8B and 8C are fragmentary top plan, front elevation and right side elevation views showing cassette movement from the leader tape equalization position to the leader tape extraction position;

FIGS. 9, 10 and 11 are enlarged fragmentary views of the cassette in the leader tape extraction position showing leader tape extraction in sequence;

FIGS. 15A, 15B and 15C are fragmentary top plan, front elevation and right side elevation views showing splicing block and cassette position during leader tape extraction;

FIGS. 19A, 19B and 19C are fragmentary top plan, front elevation and right side elevation views showing cassette and splicing block movement during the first stage of splicing, corresponding generally with FIG. 18;

FIGS. 23A, 23B and 23C are fragmentary top plan, front elevation and right side elevation views showing cassette and splicing block positions as the leader tape is being cut;

FIGS. 26A, 26B and 26C are fragmentary top plan, front elevation and right side elevation views with the shift block position corresponding generally to FIG. 24;

FIGS. 27A, 27B and 27C are fragmentary top plan, front elevation and right side elevation views of the splicing block and cassettes during the first splice corresponding generally to FIG. 24;

FIGS. 28A, 28B and 28C are fragmentary top plan, front elevation and right side elevation views of the splicing block and cassettes during loading of the magnetic tape into the cassette at the loading position;

FIGS. 29A, 29B and 29C are fragmentary top plan, front elevation and right side elevation views of the splicing block and cassettes during the step of cutting the magnetic tape after the cassette is loaded;

FIGS. 30A, 30B and 30C are fragmentary top plan, front elevation and right side elevation views of the splicing block and cassettes during the step of shifting the shift block to align the magnetic tape with the leader tape;

FIGS. 31A, 31B and 31C are fragmentary top plan, front elevation and right side elevation views of the splicing block and cassettes during the step of splicing the magnetic tape to the leader tape;

In FIGS. 5, 8, 12, 15, 19, 23, 26, 27, 28, 29, 30, 31 and 32 (A, B and C in each instance) a cassette position which is empty of a cassette during a given step is shown in dotted lines, and a cassette position which is occupied by a cassette is indicated by showing the cassette 11 itself in solid lining. By comparing the A, B and C views, the position of the cassettes 11 during processing can be observed.

DESCRIPTION OF THE PREFERRED EMBODIMENT AND BEST MODE

General Description of Loading Process

Figure 4:
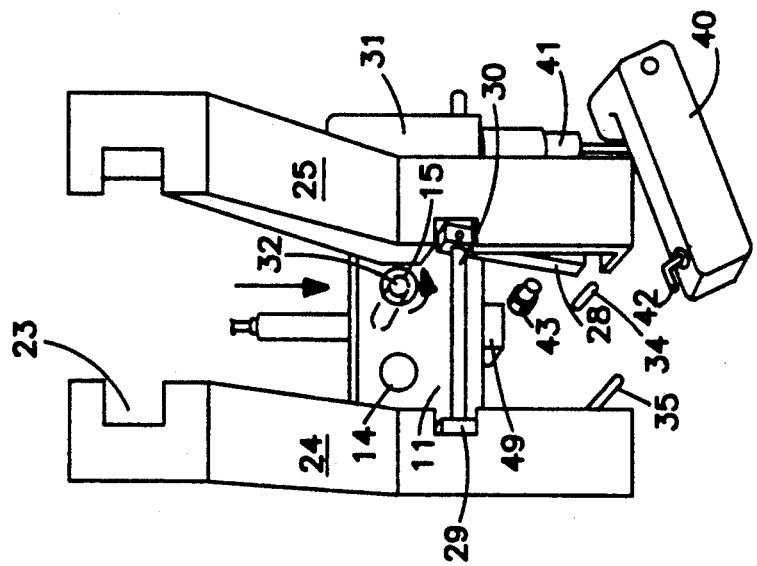
FIGS. 2, 3 and 4 are enlarged fragmentary views of the cassette holding assembly portion of the cassette loader shown in FIG. 1, showing the cassette leader tape equalization steps in sequence.

Referring now specifically to the drawings, a cassette loader according to the present invention is illustrated in FIG. 1 and shown generally at reference numeral 10.

Before describing in detail the operation of the cassette loader 10, the cassette and the general manner in which such a cassette is loaded with magnetic tape is described. Cassettes 11 are formed of a pair of shell halves 12, 13 which are secured together by glue, screws, sonic welding or other means to form the body of the cassette 11. A pair of hubs 14, 15 are positioned within the shell halves 12, 13 and are designed to freely rotate. A length of leader tape, about 70 cm, is attached by its opposite ends to the hubs 14, 15. Thus, as used in the cassette loader 10, the cassette 11 is already loaded with the leader tape. Cassette 11 has a pair of capstan holes 16 and a pair of reference holes 17 on both sides, i.e., in both shell halves 12, 13. The bottom of the cassette is open to permit access by record and playback heads, drive capstans, etc.

In the audio industry these cassettes are referred to as "C-0" cassettes since in this form the cassette has "zero" minutes of recorded material. The purpose of the cassette loader 10 is to load a predetermined length of magnetic tape into the cassette 11 after the cassette shell has been assembled with the hubs and leader tape inside the cassette shell.

Cassette loading includes a number of general steps. First the leader tape must be "equalized" within the cassette 11. This means that the leader tape must be wound onto one of the hubs 14 or 15, depending on the orientation of the cassette 11 in the cassette loader 10. Then, the leader tape is extracted from the cassette 11. The leader tape is severed at a point approximately equidistance the opposite ends. One of the ends of the leader tape is spliced to end of the magnetic tape to be loaded into the cassette 11. One of the hubs 14 or 15 is rotated, causing a length of magnetic tape to be fed off of a supply reel of magnetic tape and wound into the cassette 11. The trailing end of the magnetic tape is severed and spliced to the other piece of leader tape which is then wound into the cassette 11. Any slack in the tape is taken up, and the cassette 11 is ejected. According to modern automated methods, this process can be carried out in approximately 5 to 15 seconds by prior art methods and on prior art machines. Of this amount of time, approximately 2 seconds is required to equalize the leader tape and then extract the leader tape from the cassette 11 for splicing. In Zophy, the machine is simply two complete winders in a single cabinet with two of most of the components needed for winding two cassettes at the same time. This is quite distinct from the present invention which permits simultaneous processing with very few more components than prior art single cassette winders.

Detailed Description Cassette Loader 10

Referring now to FIG. 1, the design and structure of the cassette loader 10 is explained. Operation of the cassette loader 10 according to the method of the application is explained in the following subsection entitled "Detailed Description of Cassette Loading Process."

Cassette loader 10 is mounted in a cabinet 20 to place the cassette loader 10 at a height suitable for being attended by an operator. Cassette loader 10 is microprocessor controlled by an Intel 8051 microprocessor. Air is supplied to the various air cylinders by a compressed air supply through an air supply manifold. Appropriate electrical controls and switches are provided. Vacuum pressure is supplied from a small vacuum pump. These components are per se conventional and are not further described.

Cassettes 11 are fed one at a time from a cassette supply magazine 21 which holds a large number of cassettes. A cassette feeder 22 removes a cassette 11 from the bottom of magazine 21 and moves it to a cassette loading chamber 23. A balance mechanism orients the cassette 11 so that it falls into the loading chamber 23 with the open bottom of the cassette 11 facing downwardly.

Cassette loading chamber 23 comprises a pair of spaced-apart machined aluminum frames 24, 25 which face each other and which guide the cassette 11 between them along an inclined chute 25A to a first position which comprises a leader equalization position. A cassette 11 is shown in this position in FIGS. 2, 3, 4 and 12. Cassette 11 is moved to this position by gravity. Cassette 11 is held in the leader equalization position by a shelf 26 formed on one side of each of a pair of loading levers 28, 29. The loading levers 28, 29 are connected together and move in unison by means of a connecting arm 30. Connecting arm 30 is actuated by an air cylinder actuator 31.

In the leader equalization position a leader equalization drive spindle 32 is provided for winding the leader tape within the cassette 11 onto right-hand cassette hub 15.

Figure 13:
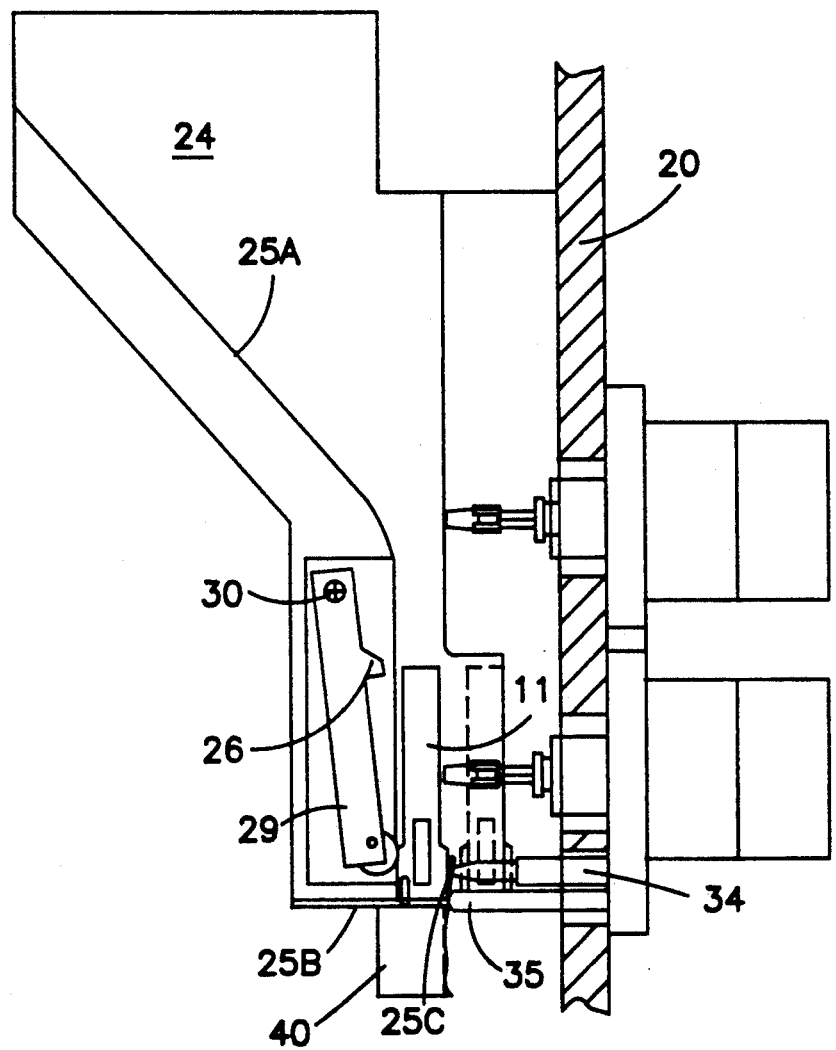

The cassette 11 is moved then to a leader extraction position below the equalization position. Loading levers 28, 29 are retracted sufficiently to permit cassette 11 to fall into the extraction position. See FIG. 13. Cassette 11 is shown in this position in FIGS. 7 and 13. Cassette 11 is supported at this position by a shelf 25B (See FIGS. 12, 13, 14 and 14B) at the bottom of the inclined chute 25A.

A leader tape extractor assembly 40 is pivotally mounted on the front of cabinet 20 by means of an extractor assembly air cylinder 41. A leader tape extractor hook 42 is carried by the extractor assembly 40 and pivots 90 between the position shown in FIGS. 2, 3 and 4 and the position shown in FIGS. 9, 10 and 11.

A winding spindle 43 is driven by a microprocessor-controlled motor (not shown) and engages the hub 15 to wind magnetic tape into the cassette 11.

An arcuate leader transfer arm slot 45 is formed in the front of cabinet 20. A leader transfer arm 46 moves in transfer arm slot 45. Transfer arm 46 is not guided by the slot 45. As is best shown in FIGS. 9, 10 and 11, an extractor guide pin 47 is mounted for reciprocating movement on an air cylinder 48 extending through leader transfer arm 46. See FIGS. 10 and 11. The leader transfer arm 46 and extractor guide pin 47 cooperate to pull a loop of leader tape from the cassette 11 across a splicing block 50 which has a planar splicing surface. The transfer arm crosses in an arc from below to above and then below the extended plane of the splicing surface of the splicing block 50 as it moves from the leader tape extraction position to the leader tape delivery position on the other side of the splicing block 50. As this happens a leader tape separator air cylinder 51 extends a leader separator pin 52 which separates the upper and lower lengths of leader tape. A vacuum port in the separator pin 52 exerts a vacuum pull on the upper length of leader tape and holds it stationary while the lower length of leader tape is shifted with the splicing block 50.

Splicing block 50 is mounted on the front of cabinet 20 by an air cylinder (not shown) and is moveable between a position flush against the front of cabinet 20 and a position extended out away from the front of cabinet 20. Compare FIGS. 15 and 19. Splice block 50 includes a recessed vacuum track 54. Vacuum is supplied to the vacuum track 54 through a plurality of spaced-apart vacuum ports 55 spaced along the length of vacuum track 54. Vacuum track is just wide enough to accommodate the width of the leader tape which is laid into the vacuum track 54.

Figure 16:
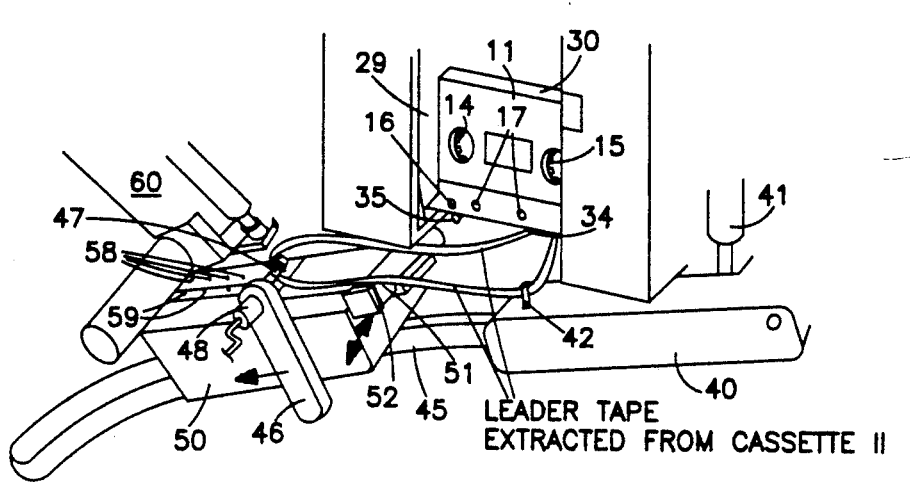
FIG. 16 is an enlarged, fragmentary view of the cassette loader showing leader tape extraction and separation.

A shift block 57 is mounted for sliding movement on the splicing block 50. Shift block 57 includes a pair of parallel extending vacuum tracks 58, 59, as is shown in FIG. 16. Vacuum tracks 58, 59 have a width sufficient to accommodate the leader tape or magnetic tape. Shift block 57 always moves in unison with the movement of splicing block 50.

Figure 22:
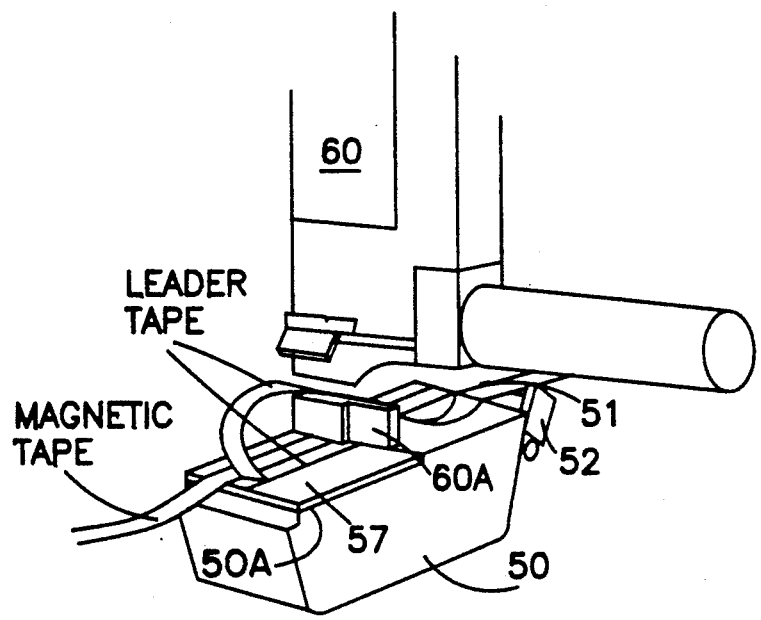
FIG. 22 is an enlarged view of the splicing block as the leader tape is being severed.
Figure 24:
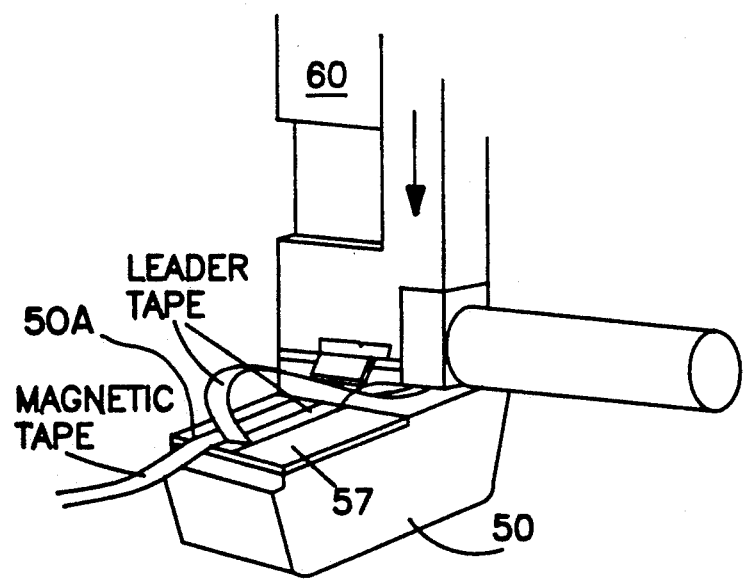
FIG. 24 is an enlarged view of the splicing block as the shift block shifts outwardly and the leader tape is spliced to the magnetic tape.
Figure 25:
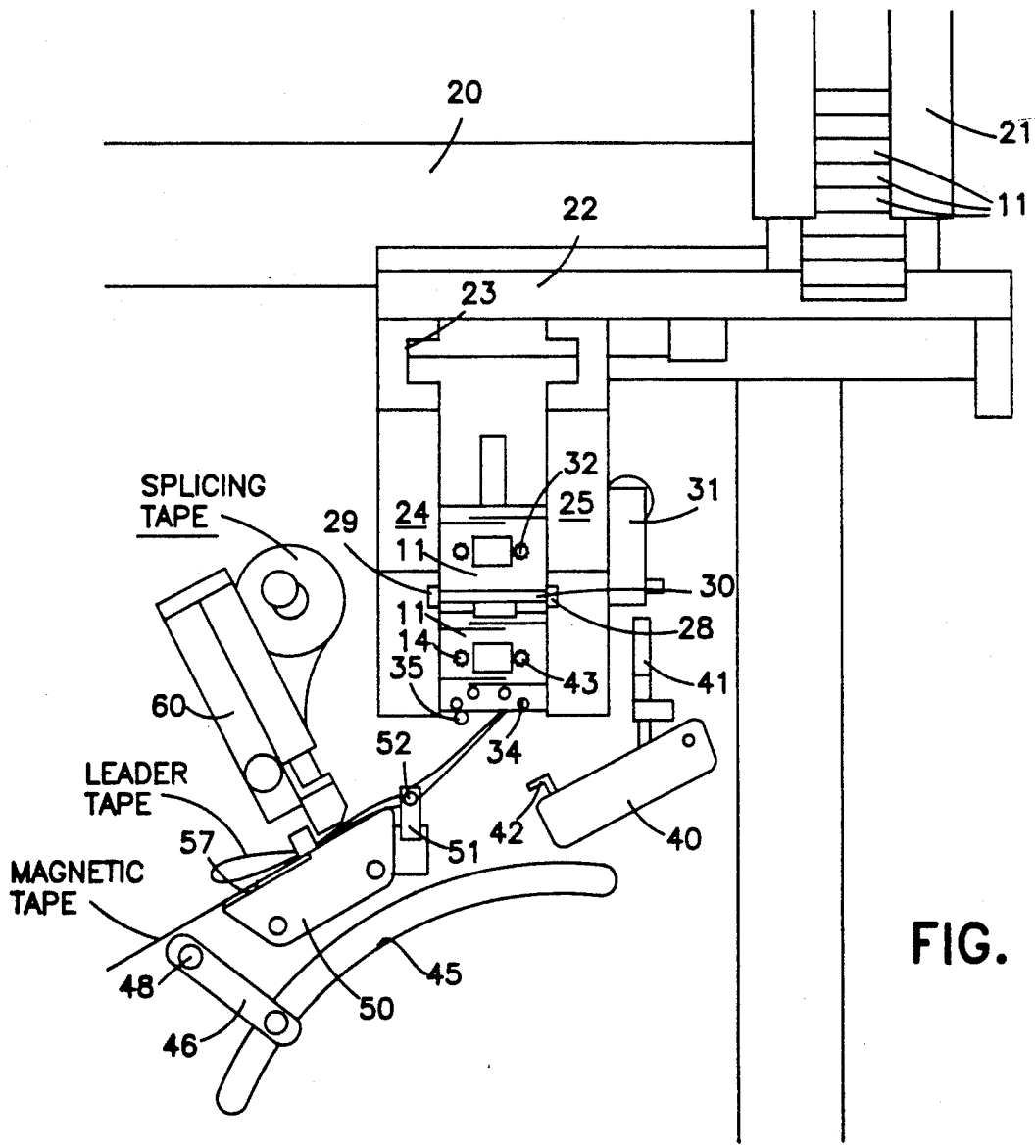
FIG. 25 is a front elevation view of the cassette loader showing the respective positions of a cassette in the leader tape equalization position and another cassette in the cassette loading position.

Shift block shifts between a position where vacuum track 59 is aligned with the vacuum track 54 in the splicing block 50 (See FIGS. 22 and 23, and a position where vacuum track 58 is aligned with the vacuum tract 54 in splicing block 50 (See FIGS. 24 and 26.

The magnetic tape is spliced to the leader tape by operation of a splicer 60. Splicer 60 is fully described in applicant's U.S. Pat. No. 4,551,190 (Farrow) and is not further discussed in this application. In general, a laterally reciprocating razor blade severs the leader tape and magnetic tape, and a vertically reciprocating splicing wheel applies a short length of adhesive splicing tape to the joint between the adjacent leader and magnetic tape. The operation of the splicer 60 is timed to the operation of the other assemblies making up the cassette loader 10.

Figure 14:
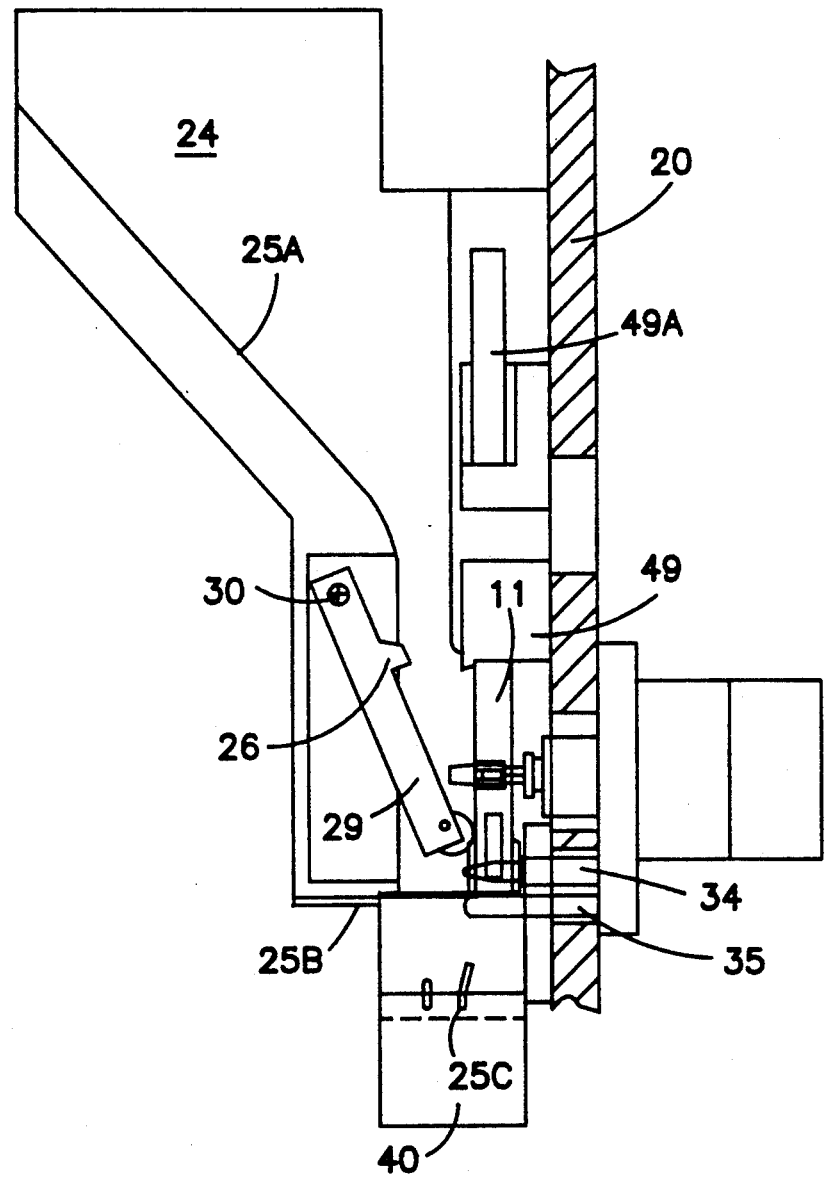

Before the leader tape has been spliced to the magnetic tape the splicing block 50 shifts in and, simultaneously, cassette 11 is shifted to the winding position with winding spindle 43 extending into hub 15. This position is shown in FIG. 14. A place bar 49 powered by an air cylinder 49A reciprocates between a retracted position and an extended position against the top of the cassette 11 to hold the cassette 11 in the winding position on the winding spindle 43.

A supply of magnetic tape is contained on a large tape reel 62 mounted on a hub 63 driven by an electric motor (not shown). The assembly of the magnetic tape on the reel 62 is referred to as a "pancake." The magnetic tape may be blank, i.e. unrecorded, or it may be in the form of a series of prerecorded "albums" separated by a discrete electronic queuing signal applied to the magnetic tape. The queuing signal indicating the end of one album and the beginning of the next album is sensed by a pick-up head 65. The detection of this signal commences the various steps required to eject a loaded cassette 11 and begin loading a cassette 11 which has been equalized.

Listing of Loading Process Steps

Figure 3:
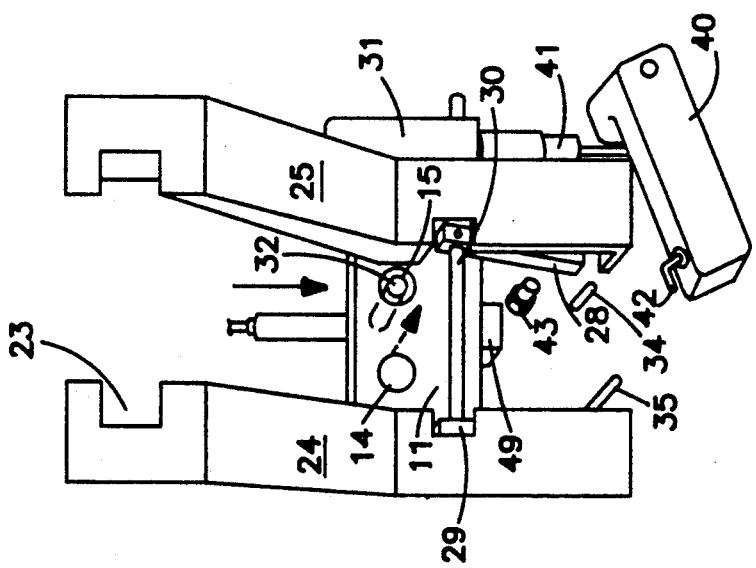
Figure 2:
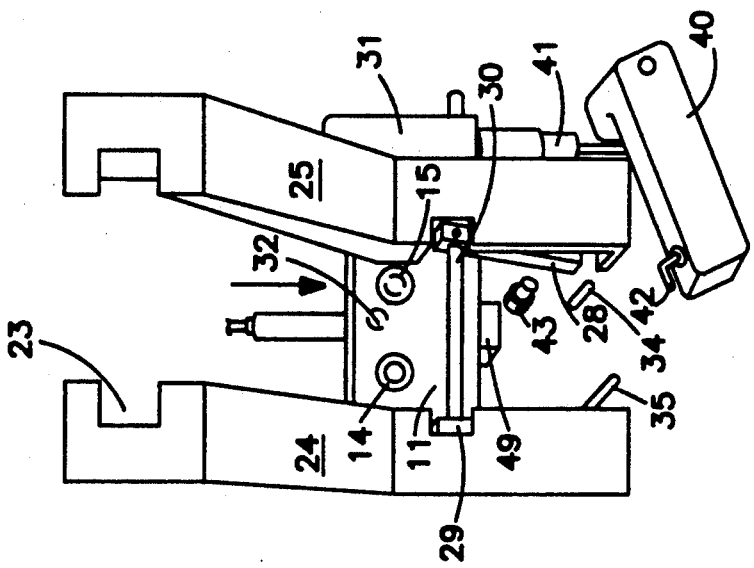
Figure 7:
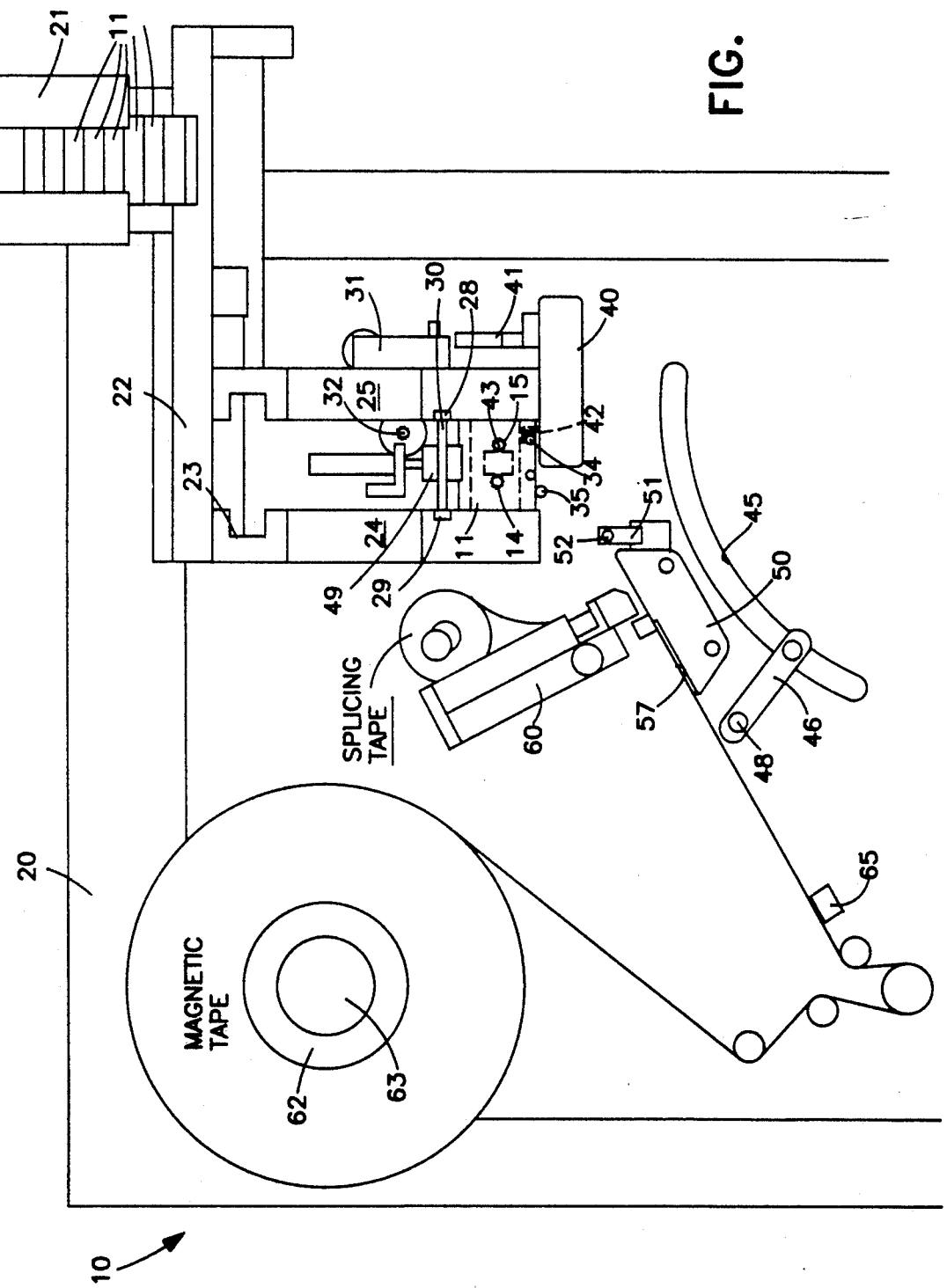
FIG. 7 is an enlarged front elevation view showing movement of the cassette from the leader tape equalization position vertically downwardly into the leader tape extraction position.
Figure 12:
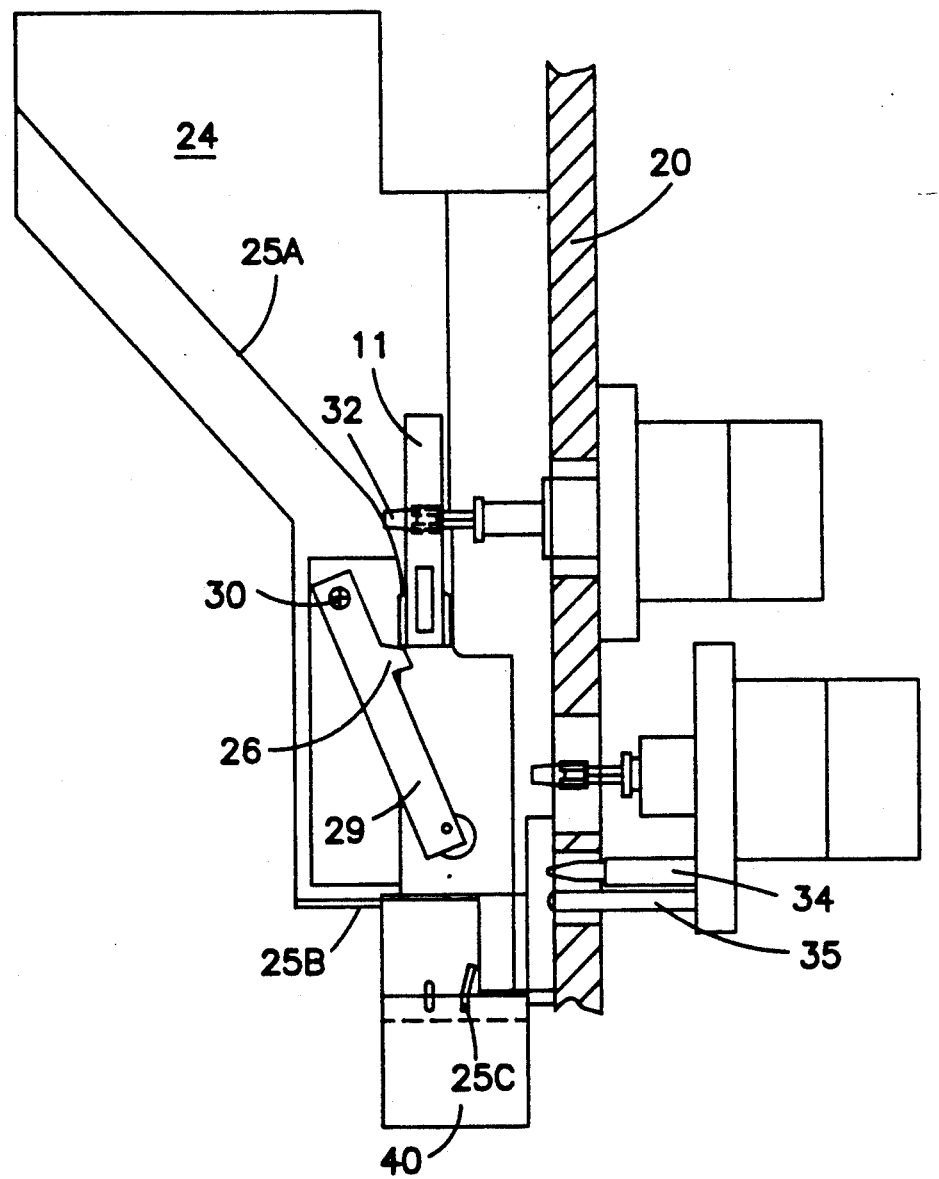
FIGS. 12, 13 14 and 14A are enlarged fragmentary views of the operation of the loading levers in moving the cassette between equalization, tape extraction and loading positions.
Figure 17:
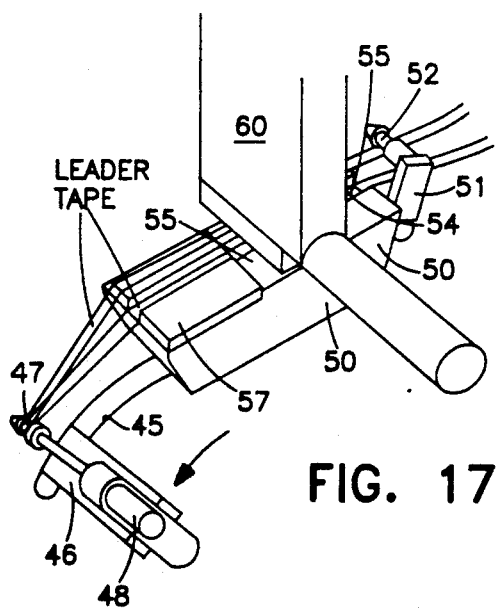
FIG. 17 is an enlarged, fragmentary view of the leader tape being drawn over the splicing block.
Figure 18:
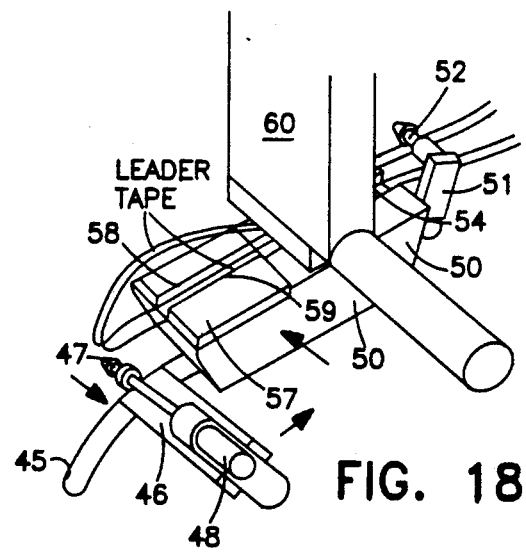
FIG. 18 is an enlarged, fragmentary view of the movement of the splicing block and the leader transfer arm during the first stage of splicing.
Figure 20:
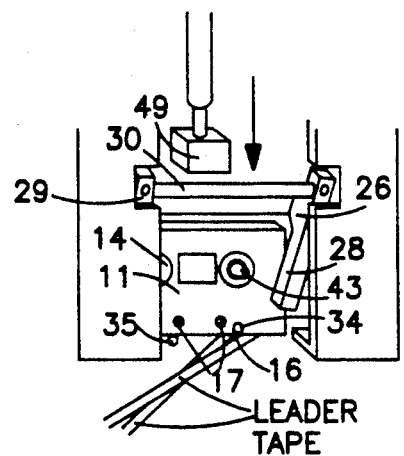
FIG. 20 is an enlarged perspective view showing movement of the cassette place bar onto the top of the cassette and the movement of the cassette alignment and support pins into position.
Figure 21:
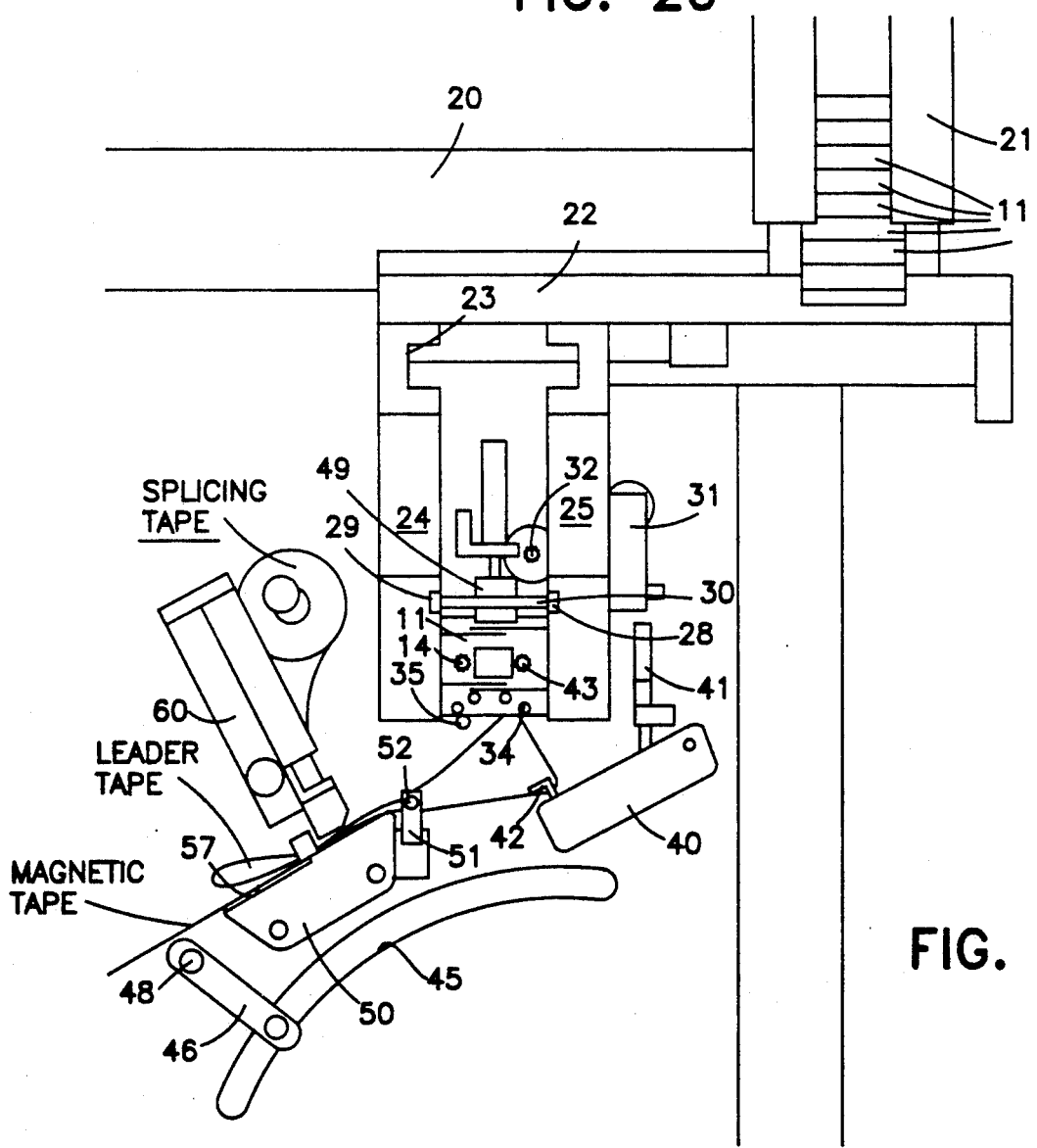
FIG. 21 is a fragmentary front elevation view showing the cassette in the loading position just prior to the first splice and the commencement of magnetic tape loading.

A sequential listing of the process steps carried out by the cassette loader 10 according to the invention follows, correlated with the drawings:
1. A cassette 11 is transferred from the cassette supply magazine 21 to the leader tape equalization position; FIGS. 2 and 6.
2. leader equalization drive spindle 32 is extended into hub 15 of cassette 11; FIG. 3.
3. leader tape is wound onto hub 15; FIG. 4 and 5.
4. leader tape extractor assembly 40 and extractor hook 42 are raised to leader tape extraction position; FIG. 6.
5. equalized cassette 11 is moved to the leader extraction position; FIG. 7 and 8.
6. extractor hook 42 is pivoted to hook leader tape; FIG. 9.
7. leader tape extractor assembly 40 pivots down, extracting leader tape from cassette 11; FIG. 10.
8. leader transfer arm 46 moves right to a position under cassette 11; FIG. 10.
9. extractor guide pin 47 extends into the extracted loop of leader tape; FIG. 11.
10. splicing block 50 shifts out away from cabinet 20; FIG. 15.
11. leader tape separator pin 52 moves into loop of leader tape and holds upper length of leader tape with vacuum away from splicing block 50; FIG. 16.
12. bottom length of leader tape falls into vacuum tracks 54 and 59 as transfer guide passes; FIGS. 16 and 17.
13. leader transfer arm 46 reverses and guide pin 47 retracts, releasing loop of leader tape; FIG. 18.
14. splicing block 50 shifts in against cabinet 20; FIG. 19.
15. winding spindle 43 extends outwardly into winding position; FIG. 28.
16. loading levers 28 transfer cassette 11 to winding position and onto winding spindle 43; FIG. 20.
17. place bar 49 extends downwardly and locks cassette 11 into winding position; FIG. 20.
18. tape cutter 60A severs leader tape loop; FIGS. 21–23.
19. shift block 57 shifts out aligning vacuum track 58 containing magnetic tape with leader in vacuum track 54; FIG. 26.
20. splicer 60 splices leader tape to the magnetic tape; FIGS. 24 and 27.
21. winding cycle begins—winding spindle 43 begins winding magnetic tape into cassette 11; FIG. 28.
22. START SECOND TAPE CYCLE FROM STEP 1 THROUGH STEP 8 BEGINS;
23. winding stops when correct length of magnetic tape has been wound into cassette 11; FIG. 28.
24. Tape cutter 60A severs magnetic tape; FIG. 29.
25. shift block 57 shifts back end to align trailing end of leader tape in vacuum track 59 and magnetic tape in vacuum track 54: FIG. 30.
26. splicer 60 splices leader tape and magnetic tape together; FIG. 31.

Figure 32A:
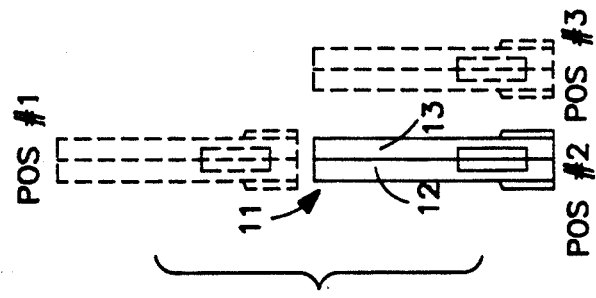
FIGS. 32A, 32B and 32C are fragmentary top plan, front elevation and right side elevation views of the splicing block and cassettes during the step of winding the slack magnetic tape and ejecting the loaded tape.
Figure 32B:
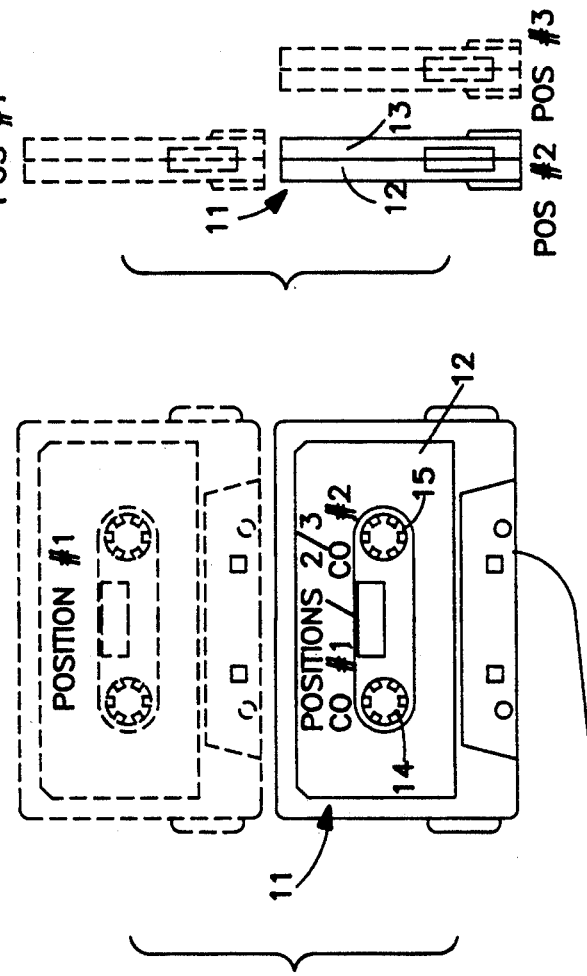
Figure 32C:
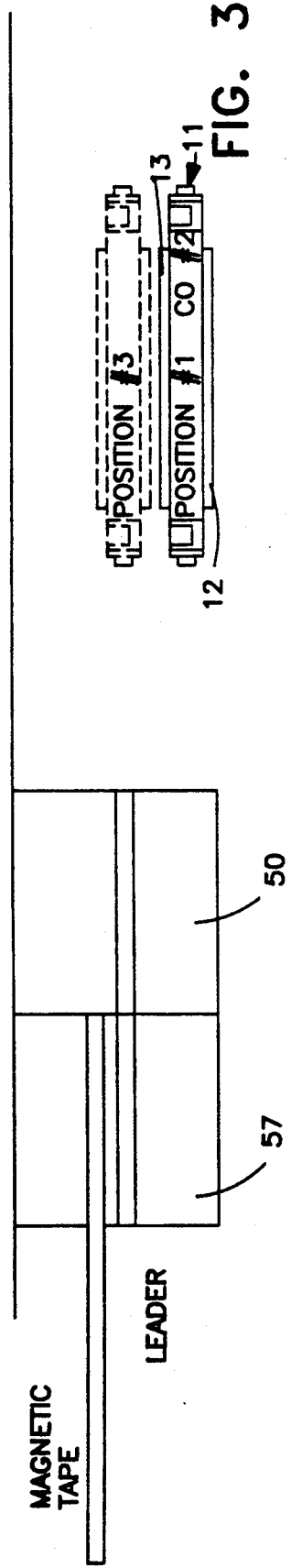

27. vacuum in vacuum tracks 54 and 59 is shut off (vacuum in track 58 stays on to hold magnetic tape;
28. vacuum to separator pin 52 is shut off and separator 52 is retracted;
29. winding spindle 43 is re-activated and remaining leader tape is wound into cassette 11; FIG. 32.
30. splicing block 50 is shifted outwardly away from cabinet 20;
31. winding spindle 43, support pin 35 and alignment pin 34 are disengaged from cassette 11;
32. place bar 49 ejects cassette 11 downwardly when winding spindle 43, support pin 35 and alignment pin 34 are disengaged from cassette 11;

Narrative Summary of Loader Operation

From the foregoing description of the loader and process steps it can be seen that substantial efficiency improvements are achieved by carrying out certain process steps simultaneously. As described above, once the first cassette 11 in the particular batch run has been equalized and moved into the leader extraction position, a second cassette 11 is loaded into the equalization position. When equalization is complete, the second cassette is loaded into the splicing position and made ready for splicing as soon as the first cassette has completed loading and the second splice (connecting the trailing leader tape to the trailing end of the magnetic tape) has been completed. This results in a saving of about 1 second per cassette loading operation after the first cassette is equalized and loaded. Since each cassette can be processed in approximately 5 to 15 seconds depending on length of tape, this saving means that between 5 to 20% more cassettes per hour can be loaded with no increase in the actual speed of the magnetic tape moving into the cassette 11. This is a substantial increase in efficiency.

Other substantial mechanical improvements in cassette loading technology have been made as well. The cassette 11 is more often under positive mechanical control in the apparatus of the invention. This provides more precise locating of the cassette 11 and permits more precise and refined process steps. The use of loading levers 28 to precisely locate the cassette 11 in the equalization, leader tape extraction and winding positions provides a more accurate wind and less likelihood of cassette misfeeds. The cassette 11 is so precisely aligned that an extractor hook 42 can penetrate the bottom of the cassette 11 between the leader tape and the side of the cassette shell half without touching either. By then rotating the hook 42, the leader tape is positively secured and a loop formed without the use of vacuum. The leader tape is then extracted from the cassette 11.

The ability to consistently form an open loop in the leader tape permits the use of an entirely new type of leader tape transfer mechanism. Prior art leader tape transfers take place in a straight line from directly beneath the cassette 11 to the splicing position. See, e.g., U.S. Pat. Nos. 4,061,286 (King, Sr. et al) and 3,997,123 (King). This straight line movement makes it difficult to accurately place the leader tape into the vacuum tracks of the splicing blocks in sufficiently intimate contact to be held in place by the splicing block vacuum.

In the cassette loader 10, the leader tape transfer arm 46 moves in an arcuate motion thereby permitting the leader tape to be carried over the top splicing surface of the splicing block 50 and then down past the surface of the splicing block 50. In effect, the leader tape is "wrapped" around the top of the splicing block 50. This achieves a positive application of the leader tape into the vacuum tracks 54 and 59.

The splicing block 50 is also improved over prior art designs. Splicing block 50 now includes a shift block 57 which has two parallel vacuum tracks 58 and 59. Shift block 57 moves with splicing block 50 but also has a shifting motion relative to splicing block 50, thereby alternating alignment of vacuum tracks 58 and 59 with the vacuum track 54 in splicing block 50. This procedure greatly simplifies the splicing operation and permits the provision of separate cassette leader tape extraction and cassette loading positions.

Proper placement of the cassette 11 for leader tape extraction and loading has also been addressed. In order to use the leader tape extractor hook 42 to form the leader tape loop, the cassette 11 must be very precisely positioned. Since the leader tape is 0.150" in width and the bottom opening of the cassette 11 is 0.385", the hook 42 must be able to consistently pass through an opening approximately 0.117" wide (the space between one side of the leader tape and the adjacent cassette shell half) without damage to the cassette 11 or the leader tape. This precision is accomplished by a flag 25C which limits inward travel of the cassette 11. See FIGS. 12, 13 and 14. The loading levers 28, 29 are primarily responsible for accurately moving the cassette 11 from the equalization position to the leader tape extraction position to the tape loading position. These steps are shown in FIGS. 12-14A. The place bar 49, the cassette support pin 35 and the cassette alignment pin 34 precisely position the cassette 11 tape loading, and insure that the respective positions are maintained without any movement of the cassette 11. This is achieved by using the cassette support pin 35 to establish the vertical plane at which the cassette must be positioned for leader tape extraction and tape loading. The cassette support pin 35 does this by engaging the bottom of the cassette 11 and supporting the cassette 11 at that position. The place bar 49 is actuated by the air cylinder 49A and engages the top of the cassette 11, forcing the cassette 11 against the cassette support pin 35. Between these two elements the cassette 11 cannot shift vertically. There is no "slop" or "play." Lateral as well as vertical positioning of the cassette 11 is achieved by the cassette alignment pin 34. The cassette alignment pin 34 extends into the right capstan hole 16 (which extends completely through cassette 11). Cassette alignment pin 34 is tapered so that it tightly engages the body of the cassette 11 surrounding the capstan alignment hole 16 on the side of the cassette 11 nearest the cabinet. The cassette 11 is therefore locked into a lateral position by the cassette alignment pin 34 without any possibility of movement until loading is over.

Figure 14A:
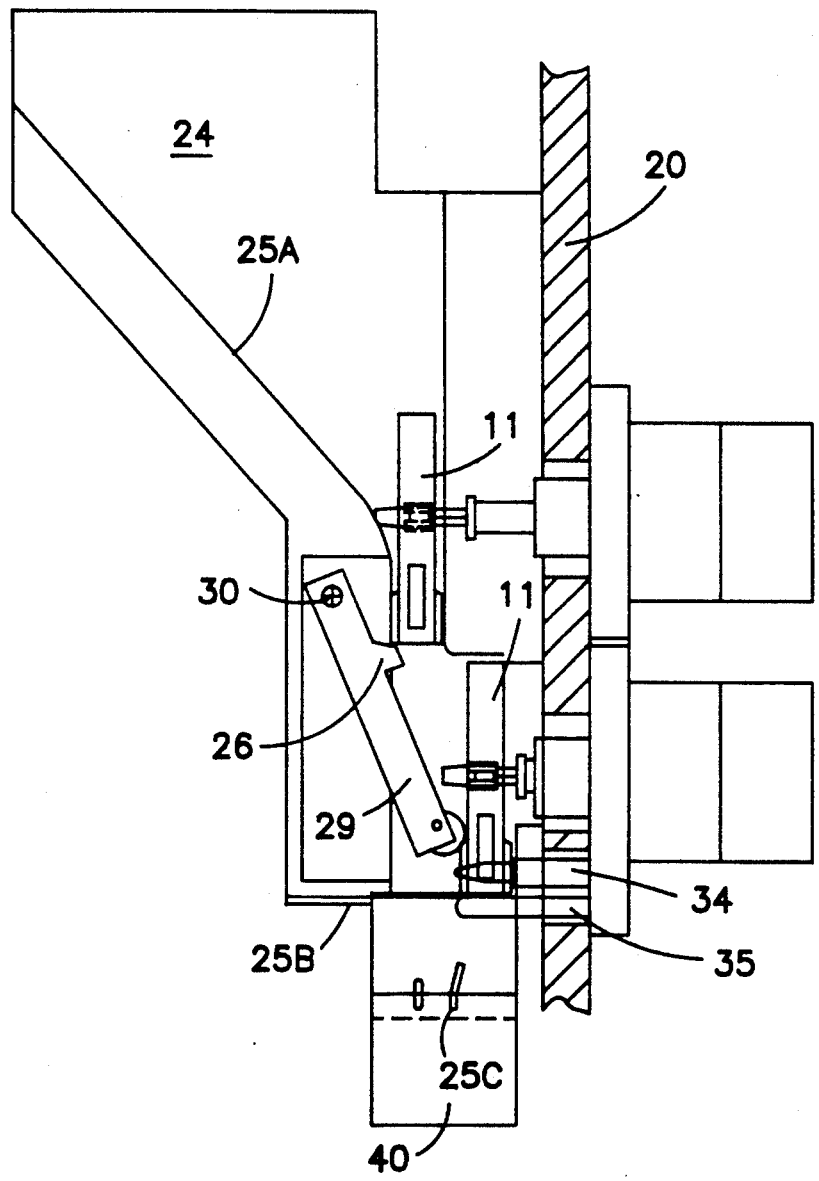

As is shown in FIG. 14A, while the first cassette 11 is being wound as described above, a second cassette 11 has been loaded into the leader tape equalization position and is being equalized. When equalization is completed, the new cassette 11 is loaded into the leader tape extraction position, spliced, and made ready to be transferred to the loading position as soon as the cassette 11 being loaded is ejected.

At step 31, above, the cassette support pin 35 and the cassette alignment pin are withdrawn from cassette 11. The air cylinder 49A which operates the place bar 49 is not fully extended, and therefore propels the cassette 11 downwardly, ejecting the cassette 11 from the loading position. The cassette 11 which is being held in the leader tape extraction position is therefore ready to be moved rearwardly by the loading levers 28 into the loading position.

A cassette loader with improved leader tape extraction and transfer means is described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

We claim:

1. A cassette loader for loading a length of magnetic tape into a cassette having a relatively short length of leader tape pre-loaded into the cassette and attached by opposite ends to respective first and second cassette hubs, said cassette loader including transfer means for transferring a length of leader tape extracted from the cassette at a leader tape extracting position on the loader to a splicing block on the loader for splicing to a length of magnetic tape, said transfer means comprising:
   (a) a transfer arm mounted for movement on said cassette loader;
   (b) leader tape guide means carried by said transfer arm for holding an extracted loop of leader tape;
   (c) movement means for moving said transfer arm in an arc between the leader tape extracting position at one side of the splicing block and a leader tape delivery position on the loader being at a point past the opposite side of the splicing block remote from the leader tape extracting position to deliver the leader tape to the splicing block for splicing, and returning the transfer arm to the leader tape extracting position;
   (d) wherein said splicing block includes a planar splicing surface for supporting the tape during splicing, and wherein said planar splicing surface defines a plane, an extension of which plane is:
   (i) above the leader tape guide means of the transfer arm when the transfer arm is at the leader tape extracting position and when the transfer arm is at the leader tape delivery position; and
   (ii) below the leader tape guide means of the transfer arm when the transfer arm is moving over the splicing block with the loop of leader tape to cause the loop of tape to be wrapped over the splicing block and thereby securely placed in contact with the splicing surface along the length of the splicing block as the leader tape is carried from the leader tape extracting position on the loader to the leader tape delivery position on the loader.

2. A cassette loader according to claim 1, wherein said transfer arm is mounted for arcuate movement in an arcuate guide slot formed in said cassette loader.

3. A cassette loader according to claim 1, wherein said transfer means includes leader tape loop separating means for keeping top and bottom lengths of the leader tape loop from touching and damaging or cutting each other during tape extraction and splicing.

4. A cassette loader according to claim 3, wherein said tape loop separating means comprises a leader separator pin movable substantially at right angles to the direction of movement of said transfer arm so that said separator pin moves into and out of a plane formed by the loop of leader tape and for moving an upper length of the loop of leader tape out of the plane of a lower length of the loop of leader tape to be placed in the splicing block for splicing by a splicer positioned above the splicing block.

5. A cassette loader according to claim 4, wherein said leader loop separator pin includes a reduced radius portion for receiving the loop of leader therein.

6. A cassette loader according to claim 5, wherein said leader loop separator pin is mounted on the cassette loader at a point between the leader tape extracting position on the loader and the splicing block.

7. A method of transferring a length of leader tape which has been extracted from a cassette on a cassette loader at a leader tape extracting position to a splicing block on said loader for splicing to a length of magnetic tape, said transfer method comprising:
   (a) providing a transfer arm mounted for movement on said cassette loader;
   (b) providing leader tape guide means carried by said transfer arm for holding an extracted loop of leader tape;
   (c) moving said transfer arm in an arc between the leader tape extracting position at one side of the splicing block and a leader taper delivery position on said loader being at a point past the opposite side of the splicing block remote from the leader tape extracting position to deliver the leader tape to a tape-receiving surface of the splicing block for splicing, wherein the step of moving the transfer arm includes the steps of moving the leader guide tape means of the transfer arm relative to an extended plane of the tape-receiving splicing surface:
   (i) below the plane of the tape-receiving splicing surface of the splicing block at the leader tape extracting position and at the leader tape delivery position;
   (ii) above the plane of the tape-receiving splicing surface of the splicing block when the leader tape guide means is moving over the splicing block with the loop of leader tape; and
   (iii) wrapping the loop of leader tape over the splicing block and thereby securely placing the loop of tape in contact with the splicing surface along the length of the splicing block as the tape is carried from the leader tape extracting position to the leader tape delivery position; and
   (d) and returning the transfer arm to the leader tape extracting position without the loop of leader tape.

8. A method of transferring a length of leader tape according to claim 7, including the step of moving the transfer arm in an arcuate movement in an arcuate guide slot formed in said cassette loader.

9. A method of transferring a length of leader tape according to claim 1, including the step of separating the loop of leader tape into top and bottom lengths of leader tape for keeping opposing side edges of the leader tape loop from touching and damaging or cutting each other during tape extraction and splicing.

10. A method of transferring a length of leader tape according to claim 9, wherein the step of separating the loop of leader tape includes the step of exerting a holding vacuum pressure on said leader tape loop.

11. A method of transferring a length of leader tape according to claim 7, including the steps of:
   (a) moving a leader separator pin at substantially right angles to the direction of movement of said transfer arm; and
   (b) moving said leader separator pin into and out of a plane defined by the loop of leader tape.

* * * * *